ята

United States Patent
Bamji et al.

(10) Patent No.: US 7,157,685 B2
(45) Date of Patent: Jan. 2, 2007

(54) METHOD AND SYSTEM TO ENHANCE DIFFERENTIAL DYNAMIC RANGE AND SIGNAL/NOISE IN CMOS RANGE FINDING SYSTEMS USING DIFFERENTIAL SENSORS

(75) Inventors: Cyrus Bamji, Fremont, CA (US); Khaled Salama, Troy, NY (US)

(73) Assignee: Canesta, Inc., Sunnyvale, CA (US)

( * ) Notice: Subject to any disclaimer, the term of this patent is extended or adjusted under 35 U.S.C. 154(b) by 0 days.

(21) Appl. No.: 11/350,209

(22) Filed: Feb. 8, 2006

(65) Prior Publication Data
US 2006/0157643 A1 Jul. 20, 2006

Related U.S. Application Data

(63) Continuation-in-part of application No. 11/110,982, filed on Apr. 19, 2005.
(60) Provisional application No. 60/650,902, filed on Feb. 8, 2005, provisional application No. 60/650,901, filed on Feb. 8, 2005, provisional application No. 60/650,900, filed on Feb. 8, 2005.

(51) Int. Cl.
*H01L 27/00* (2006.01)
(52) U.S. Cl. ............................. 250/214 A; 250/214 R
(58) Field of Classification Search ............ 250/214 A, 250/214 R, 214.1; 348/294, 296, 301, 302, 348/308
See application file for complete search history.

(56) References Cited

U.S. PATENT DOCUMENTS

| | | | | |
|---|---|---|---|---|
| 4,786,818 A | * | 11/1988 | Mead et al. | 348/308 |
| 6,323,942 B1 | * | 11/2001 | Bamji | 356/5.01 |
| 6,512,838 B1 | * | 1/2003 | Rafii et al. | 382/106 |
| 6,522,395 B1 | * | 2/2003 | Bamji et al. | 356/5.01 |
| 6,580,496 B1 | * | 6/2003 | Bamji et al. | 356/5.1 |
| 6,813,046 B1 | * | 11/2004 | Gindele et al. | 358/505 |
| 6,906,793 B1 | * | 6/2005 | Bamji et al. | 356/141.1 |
| 6,919,549 B1 | * | 7/2005 | Bamji et al. | 250/208.1 |

* cited by examiner

*Primary Examiner*—John R. Lee
(74) *Attorney, Agent, or Firm*—Michael A. Kaufman

(57) ABSTRACT

Dynamic range of a differential pixel is enhanced by injecting, synchronously or asynchronously, a fixed compensating offset ($\Delta V$) into a differential signal capacitor whenever magnitude of the differential signal across the capacitor exceeds a predetermined value. The number (N) of $\Delta V$ offsets made is counted. Effective differential signal capacitor voltage $V(t)=V_o+N \cdot \Delta V$, where Vo is capacitor voltage. Differential pixel signal/noise ratio is increased by dynamically maximizing operational amplifier gain $A_G$ for each differential pixel.

20 Claims, 21 Drawing Sheets

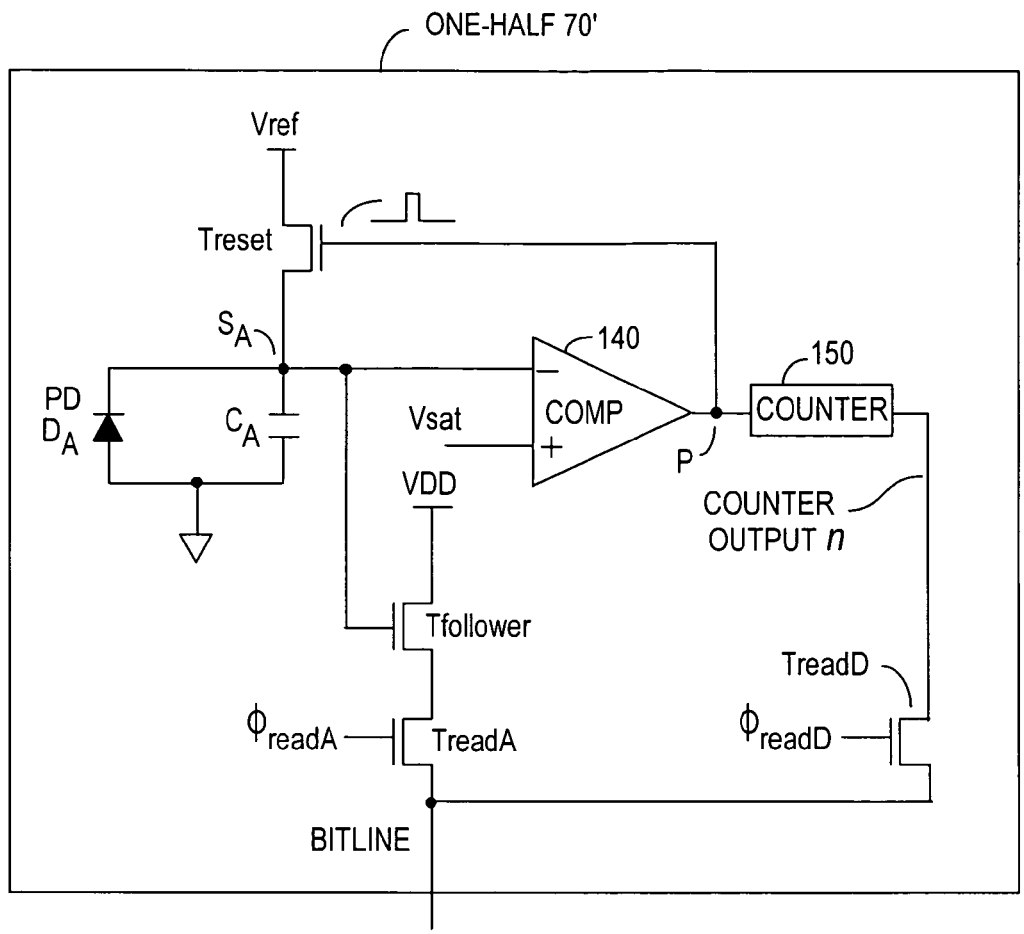
FIG. 3A
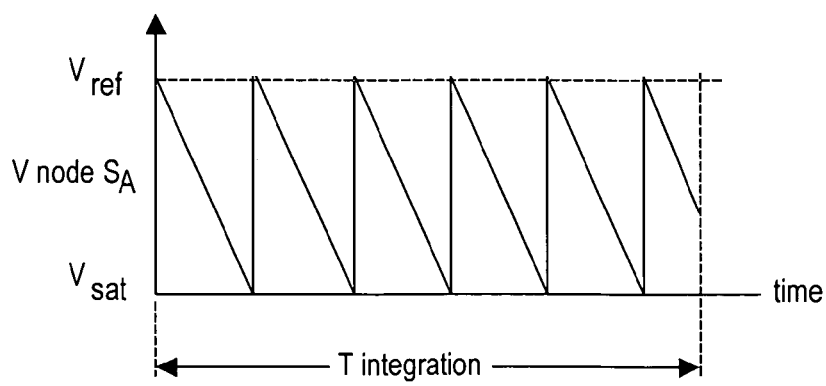
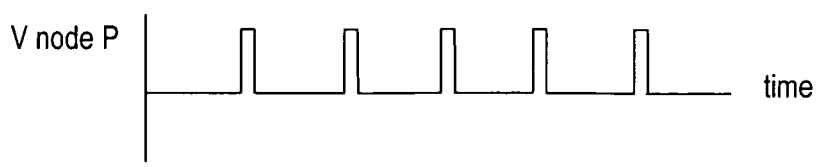
FIG. 3B

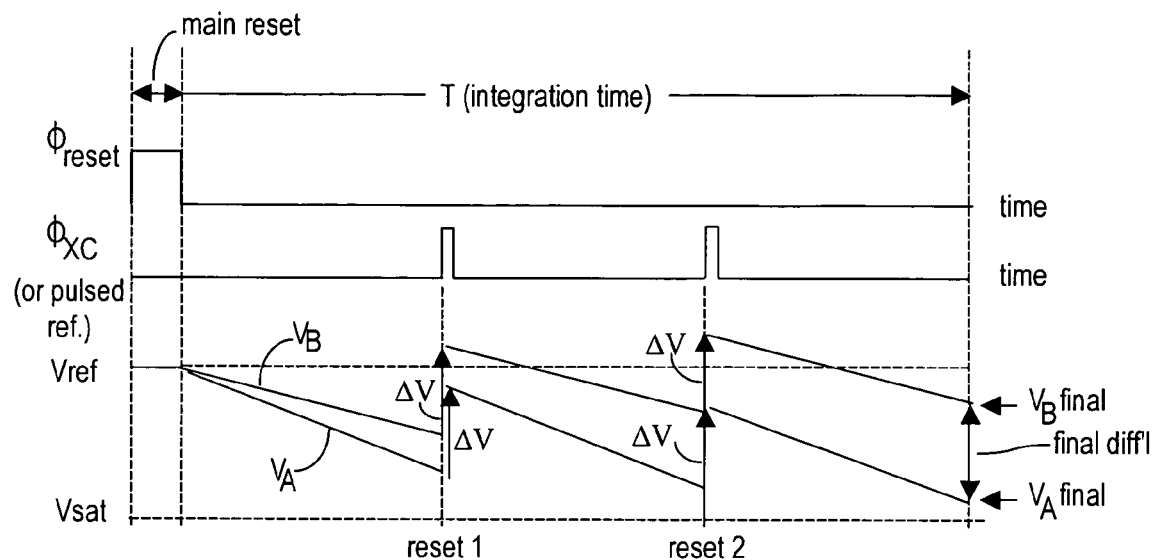
FIG. 9C
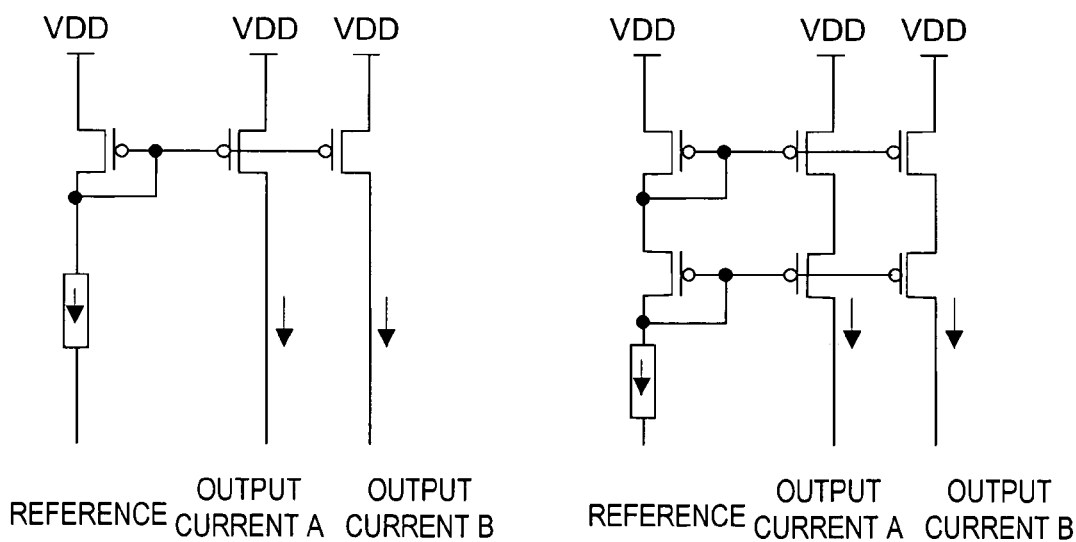
FIG. 9D
FIG. 9E

```
Reset(Circuit) and Reset(IntegrationCapacitor)
for (i=0; i< numberOfIntegrationTimeslots;i++)

Integrate for time = TotalIntegrationTime/
        numberOfIntegrationTimeslots;
    If (shallWeDoACMR(i))
       {
  {
       Common Mode Reset();
    }
    If (shallWeDoAnOffsetTest(i))
        {
           If (integrationCapacitorVoltage > Vhigh)
              {
              DumpChargeLow();
              chargeDumpCount--;
        }
           If (integrationCapacitorVoltage < VLow)
              {
              DumpChargeHigh();
              chargeDumpCount++;
    }
    }
    ReadDifferentialAndSingleEndedValues();
    }
        DumpDifferentialChargeIntoIntegra-
            tionCapacitor();
```

FIG. 16

METHOD AND SYSTEM TO ENHANCE DIFFERENTIAL DYNAMIC RANGE AND SIGNAL/NOISE IN CMOS RANGE FINDING SYSTEMS USING DIFFERENTIAL SENSORS

CROSS-REFERENCES TO RELATED APPLICATIONS

Priority is claimed from co-pending U.S. provisional patent application No. 60/650,900 filed 8 Feb. 2005 entitled Improved Op Amp Assisted CMR, No. 60/650,901 filed 8 Feb. 2005 entitled High Active Light Dynamic Range for 3-D Imaging, and No. 60/650,902 filed 8 Feb. 2005 entitled A Postiori VGA Gain Setting. Further, this is a continuation-in-part from co-pending U.S. patent application Ser. No. 11/110,982 filed 19 Apr. 2005, entitled Method and System to Differentially Enhance Sensor Dynamic Range Using Enhanced Common Mode Reset, which application was a continuation in-part of U.S. utility application entitled Method and System to Differentially Enhance Sensor Dynamic Range, application Ser. No. 10/823,415, filed 12 Apr. 2004, now U.S. Pat. No. 6,919,549 (2005) Method and System to Differentially Enhance Sensor Dynamic Range.

FIELD OF THE INVENTION

The invention relates generally to solid state optical range finding sensing systems, and more particularly to enhancing the dynamic range and signal/noise ratio in CMOS differential sensors used in such systems.

BACKGROUND OF THE INVENTION

Systems that rely upon sensing optical energy to discern information are known in the art and have many applications. Exemplary applications might include an optical-based system to determine range between the system and a target object, or to identify and recognize features of a target object. Many such systems acquire two-dimensional or intensity-based information, and rely upon an intensity image of light reflected from a target object. Such luminosity-based systems can use ambient light falling upon the target object, or may actively generate light that is directed toward the target object.

Unfortunately, it is difficult to accurately determine distance solely from the amplitude and brightness of an intensity image. For example, in a range finding system, a highly reflecting target object that is father away from the system can produce a greater amplitude signal than a nearer target object that is less reflective. The result would be that the more distant, shiny, object is erroneously reported as being closer to the system than the closer, duller, object. In a range finding system used to control robot machinery in an industrial setting, such errors may be intolerable for reasons of safety to nearby human operators. If such a system is used to identify and recognize different target objects, an object might be misidentified. Simply stated, two-dimensional intensity-based systems are very prone to measurement error.

U.S. Pat. No. 6,323,942 to Bamji et al. (November 2001) entitled "CMOS-Compatible Three-Dimensional Image Sensor IC" describes a three-dimensional range finding system that can determine range distance without reliance upon luminosity-based data, the entire content of which patent is incorporated herein by this reference. As disclosed in the '942 patent, such a system generates a depth map that contains the distance Z from each pixel in a CMOS-compatible sensor array to a corresponding location on a target object.

FIG. 1A is a block diagram of a three-dimensional range finding system 10 as exemplified by the '942 patent. Such systems determine distance Z between the system and locations on target object 20 by determining the amount of time for a light pulse to be emitted by the system, to reflect off the target object, and be detected by the system. Such systems commonly are referred to as time-of-flight or TOF systems. System 10 may be fabricated upon a single IC 30, requires no moving parts, and relatively few off-chip components, primarily a source of optical energy 40, e.g., a light emitting diode (LED) or laser source, and associated optics 50. If desired, laser source 40 might be bonded onto the common substrate upon which IC 30 is fabricated.

System 10 includes an array 60 of pixel detectors 70, each of which has dedicated circuitry 80 for processing detection charge output by the associated detector. At times herein, the terms "detector", "photodiode detector" (because of its somewhat equivalent function), "photodetector", "pixel" and "pixel detector" may be used interchangeably. More rigorously, the term "photodetector" may be reserved for the single-ended or more preferably differential photodetectors, e.g., the semiconductor devices that output detection current in response to incoming detected optical energy. In the spirit of such more rigorous definition, "pixel" or "pixel detector" would refer to the dedicated electronics associated with each single-ended or differential photodetector. In other usages, "pixel" may refer to the combination of a photodetector and it dedicated electronics. Using this terminology, array 60 might include 100×100 photodetectors 70, and 100×100 associated detector processing circuits or pixels 80, although other configurations may be used. IC 30 preferably also includes a microprocessor or microcontroller unit 90, RAM and ROM memory, collectively 100, a high-speed distributable clock 110, and various computing and input/output (I/O) circuitry 120. System 10 includes analog-to-digital conversion functions, and for purposes of the present invention, let it be understood that such functions are subsumed within I/O circuitry 120, as are some video gain functions. System 10 preferably further includes a lens 130 to focus light reflected from target object 20 upon pixels 70 in array 60. Controller unit 90 may carry out distance-to-object and object velocity calculations and can output such calculations as DATA, for use by a companion device, if desired. As seen in FIG. 1A, substantially all of system 10 may be fabricated upon CMOS IC 30, which enables shorter signal paths, and reduced processing and delay times. Also shown in FIG. 1A is ambient light that is present in the environment in which system 10 and target object 20 are found. As described herein, high levels of ambient light relative to levels of light from energy source 40 can be detrimental to reliable operation of system 10.

In brief, microprocessor 90 can calculate the roundtrip time for optical energy from source 40 to travel to target object 20 and be reflected back to a pixel 70 within array 60. This time-of-flight (TOF) is given by the following relationship:

$$Z = C \cdot t/2 \text{ where C is velocity of light.} \quad \text{eq. (1):}$$

Thus, without reliance upon luminosity information, system 10 can calculate that $Z1=C \cdot t1/2$, $Z2=C \cdot t2/2$, $Z2=C \cdot t3/2$, and so on. The correct Z distances are obtained, even if more distant regions of target object 20 happen to be more reflective than nearer regions of the target object.

The ability of system 10 to determine proper TOF distances Z can be impacted when the magnitude of ambient light is large relative to the magnitude of reflected light from source 40. What occurs is that the various pixels 70 respond to incoming optical energy that represents the real signal to be measured (e.g., active energy originating from source 40 and reflected by target object 20), and also respond to ambient light. The depth resolution of each pixel, i.e., the accuracy of the distance measurement, is determined by the system signal-to-noise ratio (S/N). Even if ambient light could be measured and subtracted from the total signal, its noise component (e.g., shot noise) would still degrade system performance. Further, the presence of ambient light can have even more severe consequences by causing the pixel detector to saturate.

A differential pixel photodetector is a detector that receives two input parameters and responds to their difference. With reference to TOF type systems, the active optical energy emitted by the system contributes to both a differential mode signal and a common mode signal, while ambient light contributes only to the common mode signal. Differential pixel detectors can exhibit higher signal-to-noise ratio than single-ended pixel detectors. However the presence of strong ambient light, sunlight perhaps, can degrade the performance of differential pixel detectors.

Differential pixel photodetectors will now be described with reference to U.S. Pat. No. 6,580,496 to Bamji et al. (June 2003) entitled "Systems for CMOS-Compatible Three-Dimensional Image Sensing Using Quantum Efficiency Modulation". The '496 patent describes the use of quantum efficiency modulation techniques and differential detectors suitable for a three-dimensional range finding systems. The quantum efficiency of the substrate upon which differential CMOS sensors were fabricated was modulated synchronously with the active optical energy emitted from an energy source. Relative phase ($\phi$) shift between the transmitted light signals and signals reflected from the target object was examined to acquire distance z. Detection of the reflected light signals over multiple locations in the pixel array resulted in measurement signals referred to as depth images.

FIG. 1B depicts a system 100 such as described in the '496 patent, in which an oscillator 115 is controllable by microprocessor 160 to emit high frequency (perhaps 200 MHz) component periodic signals, ideally representable as $A \cdot \cos(\omega t)$. Emitter 120 transmitted optical energy having low average and peak power in the tens of mW range, which emitted signals permitted use of inexpensive light sources and simpler, narrower bandwidth (e.g., a few hundred KHz) pixel photodiode detectors (or simply, photodetectors) 140'. System 100, most of which may be implemented upon a CMOS IC 30' will also include an array 130' of differential pixel photodetectors 70 and associated dedicated electronics 80. It will be appreciated that optical energy impinging upon array 130' includes a fraction of the emitted optical energy that is reflected by a target object 20, which reflected energy is modulated, and also includes undesired ambient light, which is not modulated. Unless otherwise noted, elements in FIG. 1B with like reference numerals to elements in FIG. 1A may be understood to refer to similar or identical elements.

In system 100' there will be a phase shift $\phi$ due to the time-of-flight (TOF) required for energy transmitted by emitter 120 ($S_1 = \cos(\omega t)$) to traverse distance z to target object 20, and the return energy detected by a photo detector 140' in array 130', $S_2 = A \cdot \cos(\omega t + \phi)$, where A represents brightness of the detected reflected signal and may be measured separately using the same return signal that is received by the pixel detector. FIGS. 1C and 1D depict the relationship between phase shift $\phi$ and time-of-flight, again assuming for ease of description a sinusoidal waveform. The period for the waveforms of FIGS. 1C and 1D is $T = 2\pi/\omega$.

The phase shift $\phi$ due to time-of-flight is:

$$\phi = 2 \cdot \omega \cdot z / C = 2 \cdot (2\pi f) \cdot z / C$$

where C is the speed of light 300,000 Km/sec. Thus, distance z from energy emitter (and from detector array) to the target object is given by:

$$z = \phi \cdot C / 2\omega = \phi \cdot C / \{2 \cdot (2\pi f)\}$$

Various techniques for acquiring and processing three dimensional imaging have been developed by assignee herein Canesta, Inc. of Sunnyvale, Calif. For example, U.S. Pat. No. 6,906,793 (2005) to Bamji et al. describes Methods and Devices for Charge Management for Three-Dimensional Sensing, U.S. Pat. No. 6,522,395 (2003) to Bamji et al. discloses Noise Reduction Techniques Suitable for Three-Dimensional Information Acquirable with CMOS-Compatible Image Sensor ICs; and U.S. Pat. No. 6,512,838 to Rafii et al. (2003) discloses Methods for Enabling Performance and Data Acquired from Three-Dimensional Image Systems. But it still remains a challenge to provide a TOF system with differential pixel photodetectors that are protected from saturation, including saturation from differential mode signals, while enhancing signal/noise ratios.

It is useful at this juncture to review prior art implementations for differential pixel photodetectors. Such review will provide a better understanding of the challenges presented in protecting differential pixel photodetectors against saturation, while trying to enhance signal/noise ratios. In the '496 patent, differential detectors responded to amplitude of incoming optical energy and to phase of such energy relative to energy output by emitter 40. A comparison of FIGS. 1C and 1D indicates the nature of the shift in phase ($\phi$).

Referring now to FIG. 2A, the singular term "pixel" is sometimes used collectively to refer to a pair of differential photodetectors, for example first and second photodiode detectors $D_A$ and $D_B$ as well as at least a portion of their dedicated electronics. With this understanding, what is shown in FIG. 2A is a pair 70 of pixel photodetectors, hundred(s) of which can comprise an array 130', as suggested by FIG. 1B. Incoming optical energy falling upon a pixel detector 70 generates an extremely small amount of photocurrent (or photocharge), typically on the order of picoamps ($10^{-12}$ amps). Such detection current signals are too small in magnitude to be measured directly. Pixel detectors can function in a direct integration mode in which optical energy induced photocurrent is integrated. Integration can result using an integration capacitor, where the final capacitor charge or voltage is readout at the end of an integration interval. A capacitor $C_x$ has finite maximum charge capacity $Q_{max}$ defined by:

$$Q_{max} = C_x \cdot V_{swing} \qquad \text{eq. (2):}$$

where $C_x$ is the total capacitance and $V_{swing}$ is the maximum voltage swing across the capacitor. A pixel photodetector is said to be in saturation when the total charge integrated on the capacitor exceeds the maximum charge capacity, in which case no useful information can be readout from that pixel photodetector.

A differential pixel photodetector (e.g., detectors 70 in FIG. 1B) may be represented as shown generically in FIG. 2A, in which modulation circuitry has been omitted for simplicity. Each pixel photodetector 70 has a differential structure with two perhaps identical reset and readout circuit components denoted A and B. Components A and B may be considered as part of the pixel photodetector 70 or as part of the pixel's associated circuitry 80. For ease of depictions, the photodetector pair comprising each differential pixel 70 is shown as photodiodes $D_A$ and $D_B$, but other detector structures could be used instead, for example photogate structures. Capacitors $C_A$ and $C_B$ are shown in parallel with diodes $D_A$ and $D_B$ and represent detector parasitic capacitance and/or dedicated fixed value capacitors.

Referring briefly to FIG. 1B, within system 100 microprocessor 160 commands generator 115 to cause optical energy source 120 to emit pulses of light that are directed by lens 50 toward target object 20. Some of this optical energy will be reflected back towards system 100 and will be focused by lens 135 onto pixel photodetectors 70 within array 130. Incoming photon energy falling upon a detector 70 will cause photodetector pair $D_A$ and $D_B$ to generate a small amount of detection signal current that can be directly integrated by capacitors $C_A$ and $C_B$. Before the start of integration, microprocessor 90, which may (but need not be) implemented on IC chip 30, will cause photodetectors $D_A$ and $D_B$ and their respective capacitors $C_A$ and $C_B$ to be reset to a reference voltage $V_{ref}$. For the components shown in FIG. 2A, reset is caused by raising a reset signal $\Phi_{reset}$ (see FIG. 2B). During the integration time, photocurrent generated by detectors $D_A$ and $D_B$ respectively discharge associated capacitors $C_A$, $C_B$, as shown in FIG. 2B. During the integration time, the voltage seen at nodes $S_A$, $S_B$ will decrease as a function of the photocurrent generated by the associated photodiode $D_A$, $D_B$. The magnitude of the photodiode-generated photocurrent will be a function of the amount of light energy received by the respective pixel 70 in array 60 in that the amount of light received by the pixel determines the final voltage on nodes $S_A$ and $S_B$.

Readout circuitry is provided for circuit A and B, comprising transistors $T_{follower}$ and $T_{read}$. At the end of the integration time, which will be a function of the repetition rate of the optical pulses emitted from optical energy source 40, microprocessor 90 causes a readout signal $\Phi_{read}$ to go high. This enables the voltages on nodes $S_A$ and $S_B$ to be read-out of array 60, e.g., through a bitline. In the exemplary configuration of FIG. 2A, if the voltage on node $S_A$ or $S_B$ drops below a certain level denoted here as saturation voltage $V_{sat}$, the readout circuit cannot perform the reading operation properly. Therefore the dynamic range of such known differential pixel configuration shown in FIG. 2A is $(V_{ref}-V_{sat})$, as depicted in FIG. 2B. While the waveforms in FIG. 2B depict a diminishing potential at nodes $S_A$, $S_B$ as a function of photocurrent, one could instead configure the detector circuitry to charge rather than discharge a reference node potential.

But in addition to generating photocurrent in response to optical energy or active light (from emitter 40) reflected by target object 20, pixel 70 will also generate photocurrent in response to ambient light that is also integrated by capacitors $C_A$, $C_B$, thus affecting the potential at nodes $S_A$, $S_B$. FIG. 2B depicts two examples, showing the effect of relatively low magnitude ambient light and relatively high magnitude of ambient light. In range finding applications, the difference $(A_{final}-B_{final})$ generally contains range information, and common mode is of lesser importance. As shown in FIG. 2B, relatively weak ambient light does not cause the pixel to saturate, and at the end of integration time, the final voltages read-out from the pixel are above $V_{sat}$. But relatively strong ambient light discharges the associated capacitor potential rapidly, which saturates the pixel. Due to the saturation condition, the pixel does not output any useful result in that the differential voltage, which contained range information, is now zero. Thus, a very real problem with prior differential pixel detectors is that the dynamic range of the pixel is not sufficient to handle strong ambient light.

Thus, whereas CMOS sensors used in systems to acquire images generally rely upon strong levels of ambient light, CMOS sensors used in time-of-flight systems seek to reduce the effects of ambient light. As seen in FIG. 2B, the magnitude of ambient light can overwhelm detection of reflected optical energy, saturating the detectors. Image acquisition systems and time-of-flight systems that must function in environments exposed to strong ambient light or minimal ambient light may require a sensor dynamic range exceeding about 100 dB. In time-of-flight and similar applications in which ambient light is unnecessary, the detection effects of ambient light can be substantially reduced electronically.

There is a need for a method and topology by which the dynamic range of a differential pixel detector can be enhanced without sacrificing a substantial portion of the desired differential signal. Preferably saturation of the differential pixel detector should be substantially eliminated, even from high magnitudes of the desired differential signal. Further, signal/noise ratio for the detection signal path should be enhanced. These goals preferably should be met using additional circuitry that can function with existing detector circuitry and that can be implemented to fit within the perhaps 50 μm×50 μm area of a pixel differential photodetector.

Embodiments of the present invention provide such methods and circuit topologies.

SUMMARY OF THE INVENTION

Effective differential dynamic range in a differential pixel photodetector was increased in embodiments of priority application Ser. No. 10/823,415, now U.S. Pat. No. 6,919,549 by avoiding common mode contribution saturation. Photocurrent generated by each photodetector pair was directly capacitor integrated over an integration time T such that resultant capacitor voltage was proportional to detected optical energy including ambient light. Within time T, before either integrated capacitor voltage reached $V_{sat}$ for the photodetector, at least one of the capacitors was reset to a voltage $V_{ref}$ such that the desired differential detector signal was still determinable. After reset, capacitor voltages were again allowed to change as a function of photocurrent, and were reset before either capacitor voltage reached $V_{sat}$.

In another embodiment of what is now the '549 patent, the common mode component of the integrated capacitor voltages was reset periodically to prevent either photodiode detector from saturating. However the differential component of the integrated capacitor voltages was preserved. The result was to extend effective differential dynamic range of the differential sensor in the presence of ambient light by avoiding the effects of saturation.

In parent co-pending application Ser. No. 11/110,982 filed 19 Apr. 2005, further improvements are described for differential pixels, e.g., the circuitry associated with each pixel differential photodetector. More specifically, the '982 application describes pixels with improved common mode rejection, and improved retention of the desired differential signal component, accompanied by acceptably low KT/C noise due to capacitance. In one embodiment, signals to the pixel photodetector differential inputs are coupled as input to an operational amplifier and to a differential signal capacitor, configured as an integrator. During integration, charge from the detectors is accumulated in their integration capacitors. During a charge dump operation, at least half the total differential detection signal charge from the integration capacitors is read into at least one differential signal capacitor. Such charge dumping periodically transfers the differential detector signal into the differential signal capacitor(s) for storage. Thus during common mode resets, which usually follow dump operations, the differential detection signal on the integration capacitor is essentially zero, thus reducing the chance of differential charge loss. The desired result is enhanced common mode rejection with relatively little loss in differential detection signal.

The present invention provides still further improved differential pixels, especially with respect to avoiding saturating even with relatively large amplitude differential signals, and to enhancing signal/noise ratio for the detection signal path. In some embodiments, a fixed compensating offset ($\Delta V$) is added to the differential signal capacitor voltage whenever magnitude of the differential signal exceeds a predetermined maximum or minimum value. The offset $\Delta V$ is negative if the differential signal capacitor voltage has become too positive, and the offset $\Delta V$ is positive if the capacitor voltage has become too negative. In some embodiments, the accumulated charge voltage on the differential signal capacitor is checked synchronously, at which time $\Delta V$ is added, if needed. A count is kept of the number (N) of $\Delta V$ offsets that had to be added, and effective differential signal capacitor voltage is actual output voltage across the capacitor (Vo)+N·$\Delta V$. In other embodiments, reset of the integration capacitor voltage is asynchronous, and occurs whenever the voltage exceeds a predetermined maximum or minimum threshold. Again a count of the number (N) of resets is kept, and effective differential signal capacitor voltage is Vo+N·$\Delta V$. These embodiments preserve the desired differential signal and prevent saturation of the differential pixel even when the differential signal is large in amplitude. If desired, the compensating signal $\Delta V$ could of course be $\Delta Q$, where Q is charge. Saturation due to common mode signal is prevented, preferably using embodiments of the above-referenced co-pending application Ser. No. 11/110,982.

Further embodiments of the present invention enhance differential pixel signal/noise ratio by dynamically maximizing gain on the operational amplifier associated with each differential pixel. Because such operational amplifiers are found early in the detection signal paths, high amplifier gain ($A_G$) reduces effective noise contribution downstream in the signal path by 1/Ag. Gain of each such amplifier is variably controlled to adjust $A_G$ individually for each pixel as a function of its present signal value. Within the array of differential pixels, each amplifier is first operated at maximum $A_G$, and integration capacitor values are readout and stored in a row buffer. $A_G$ for each amplifier in the row is then incrementally decreased, and the row buffer is updated only for those amplifiers whose associated integration capacitor is not presently saturated. The above process is repeated until the value in the row buffer corresponds to the highest non-saturating gain for each amplifier associated with the row. The row buffer also records the value of the highest non-saturating gain for each amplifier associated with the pixels in that row. At this juncture the row buffer is readout, and the process is repeated for the next row in the array, and so on continuously. In this fashion amplifier values of $A_G$ are individually maximized, commensurate with avoiding overload or saturation of components downstream in the signal path. The desired result is enhanced signal/noise ratio. Alternative embodiments can, of course, increment rather than decrement amplifier gain or even randomly or otherwise scan or vary $A_G$ and cause the row buffer to latch the non-saturated gain value for each amplifier associated with pixels in a row.

Embodiments of the present invention use much circuitry already in place with respect to enhancing common mode rejection and retaining desired differential signal components. As a result, implementing the present invention can be carried out within the form factor of pixel differential photodetectors.

Other features and advantages of the invention will appear from the following description in which the preferred embodiments have been set forth in detail, in conjunction with the accompanying drawings.

BRIEF DESCRIPTION OF THE DRAWINGS

FIG. 3A depicts one-half of a self-resetting differential pixel detector according to an embodiment of U.S. Pat. No. 6,919,549, from which priority is claimed;

FIG. 3B depicts waveforms present in the detector of FIG. 3A;

FIG. 9C depicts waveforms found in a current-source implemented differential pixel detector over a two reset sequence, according to an embodiment of U.S. Pat. No. 6,919,549;

FIG. 9D and FIG. 9E depicts two implementations of a CCCS current mirror for use in a differential pixel detector, according to an embodiment of U.S. Pat. No. 6,919,549;

FIG. 16 depicts exemplary pseudocode implementing synchronous differential signal capacitor resetting as depicted in FIG. 15A, according to an embodiment of the present invention;

FIG. 17C depicts an exemplary display using TOF information output from the

DETAILED DESCRIPTION OF THE INVENTION

Figure 13:
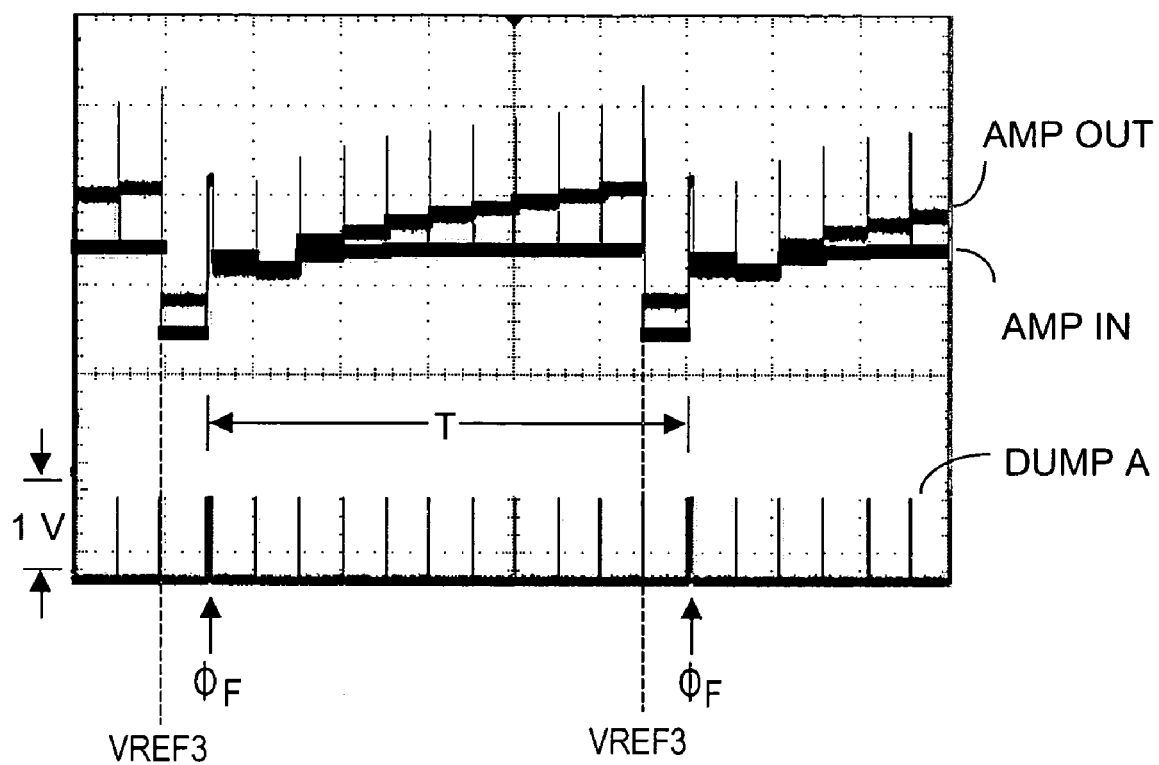
FIG. 13 depicts oscilloscope traces representing various waveforms for the embodiment of FIG. 12.
Figure 14:
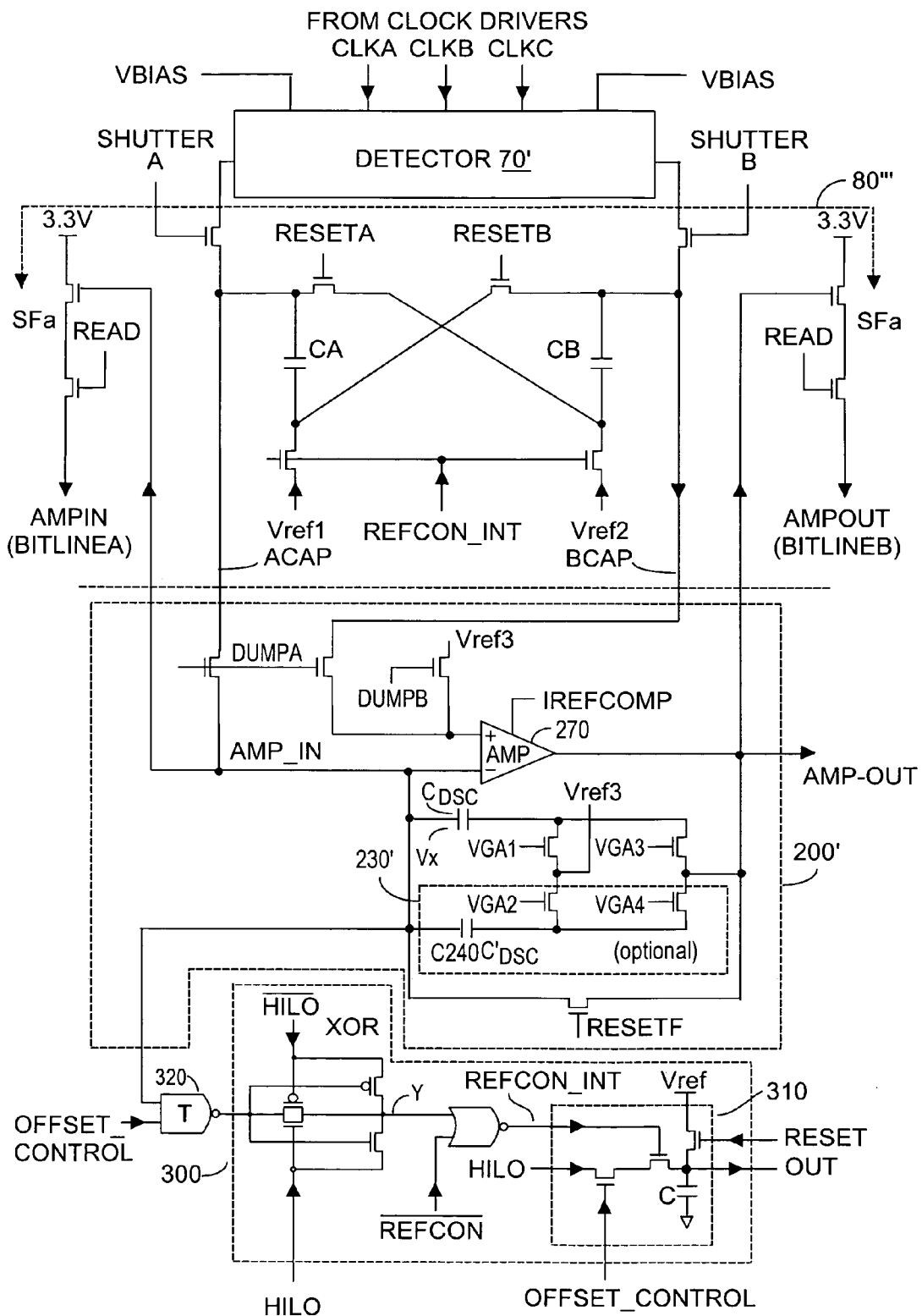
FIG. 14 depicts an embodiment of a differential pixel with improved differential dynamic range and signal/noise ratio, according to embodiments of the present invention.

Before describing the present invention, whose description commences with FIG. 14, it is useful to first describe embodiments of U.S. Pat. No. 6,919,549, from which priority is claimed. Description of the '549 patent will be made with reference to FIGS. 3A–10B. Next a description of priority application Ser. No. 11/110,982 will be made with reference to FIGS. 11, 12, and 13. An understanding of the operation of pixel differential photodetectors and the evolution of their associated electronic circuitry (sometimes referred to herein as differential pixel) will now be described with reference to FIGS. 3A–13, to enable a better understanding of the present invention.

FIG. 3A, taken from the '549 patent, depicts one-half of differential pixel detector 70', where it is understood that TOF system 100 shown in FIG. 1B might now employ an array 60' of rows and columns of differential pixel detectors 70' as will now be described, rather than pixel detectors 70. In FIG. 3A, only one of the two pixels is shown for ease of illustration, namely photodetector $D_A$ (denoted PD $D_A$). Associated with each photodetector in the pixel is a capacitor, $C_A$ being associated with $D_A$, where $C_A$ can be the capacitance inherent with $D_A$, and/or a discrete capacitor. In a conventional configuration, in the presence of a signal, typically ambient light, the voltage across $C_A$ would decrease until a saturation voltage $V_{sat}$ was attained, at which point an output signal from $D_A$ would be meaningless.

But as shown by the waveforms in FIG. 3B, the voltage at node $S_A$, e.g., the voltage across $C_A$ and across $D_A$, is prevented from exceeding $V_{sat}$ by resetting the node voltage to a fixed reference $V_{ref}$ whenever $V_{sat}$ is attained. Each differential pixel detector 70' includes two photodiodes and two capacitors, and each capacitor-photodiode node is independently reset to $V_{ref}$ as soon as the voltage across either capacitor reaches $V_{sat}$.

In FIG. 3A, a comparator 140 compares the voltage signal from photodiode $D_A$ present at node $S_A$ to $V_{ref}$. As soon as the SA potential reaches $V_{ref}$, comparator 140 changes state, going from low-to-high for the configuration shown. Thus when $VS_A > V_{sat}$, the output from comparator 140 turns-on a reset transistor $T_{reset}$ coupled between node $S_A$ and $V_{ref}$. The potential $VS_A$ at node $S_A$ is reset by being pulled from $V_{sat}$ to $V_{ref}$. The desired result is that overall dynamic range of pixel detector 70' is increased.

As shown in FIG. 3A, output from comparator 140 (node P) is also input to a counter 150 that essentially will count the number of resets that occur for the detector. It is understood that as FIG. 3A depicts half of a differential pixel detector, there will be two comparators, two counters, and two sets of switching transistors for each differential pixel detector 70'. The photodiode signal at node $S_A$ is coupled via a high input impedance voltage follower transistor $T_{follower}$, whose output is read via a bitline when a $\Phi_{readA}$ signal goes high (for the configuration shown). An additional row selection transistor $T_{readD}$ is coupled between the output from counter 150 and the bitline signal, and is turned on when a $\Phi_{readD}$ signal goes high (for the configuration shown). Note that a feedback path exists between the comparator output and the gate for reset transistor $T_{reset}$. Those skilled in the art will appreciate that means other than the above described solid state switches, comparators, counters, etc., may be used.

Figure 1A:
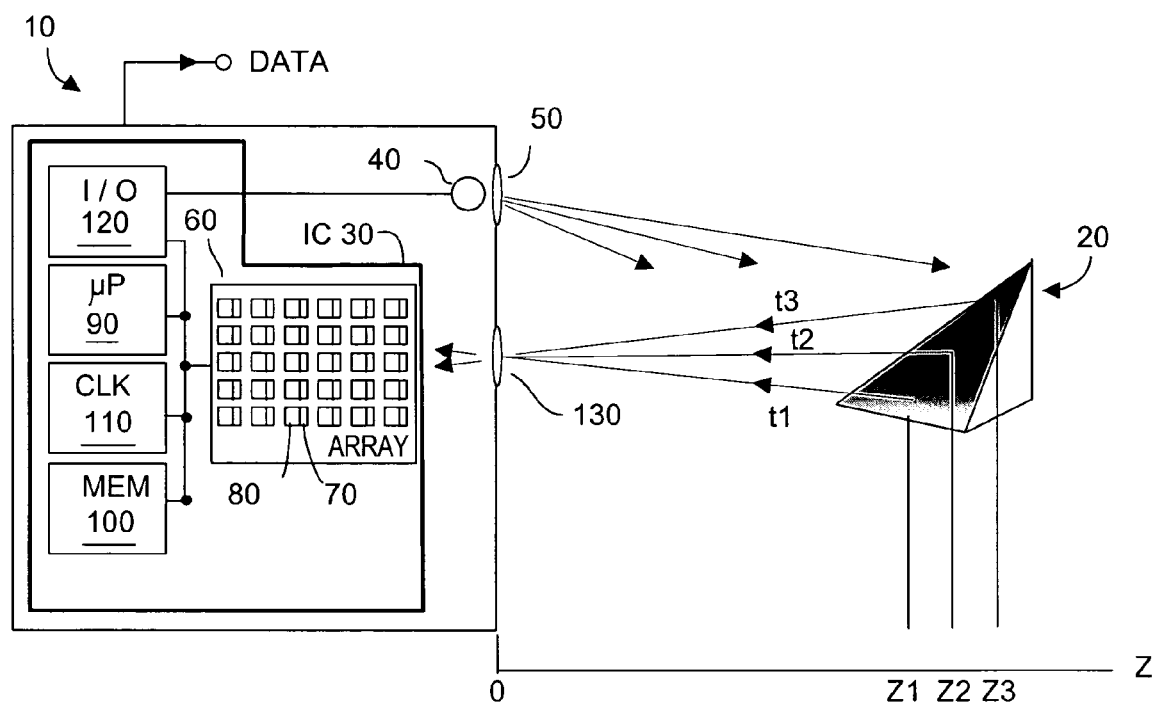
FIG. 1A depicts a three-dimension TOF system using conventional pixel photodetectors as exemplified by U.S. Pat. No. 6,323,942.
Figure 1B:
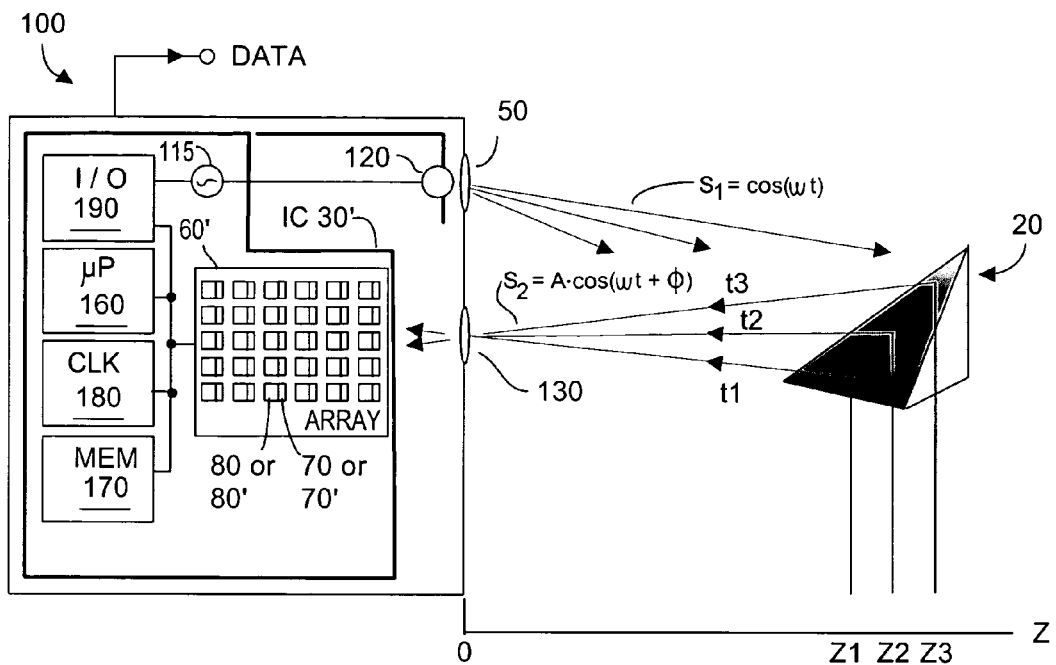
FIG. 1B depicts a phase-shift intensity and three-dimensional range finding system using differential pixel photodetectors and quantum efficiency modulation, as exemplified by U.S. Pat. No. 6,580,496.
Figure 1C:
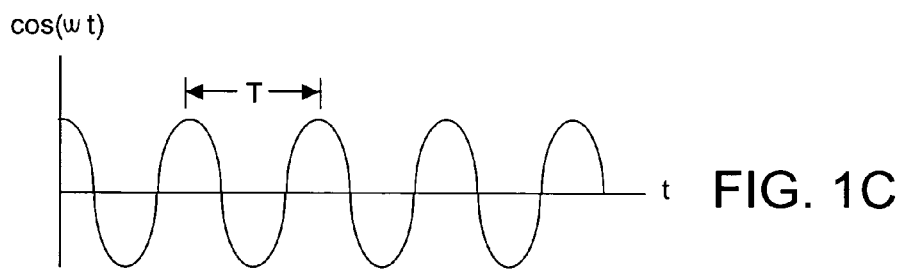
FIG. 1C depicts a transmitted periodic signal with high frequency components transmitted by the system of Fig., according to the prior art.
Figure 1D:
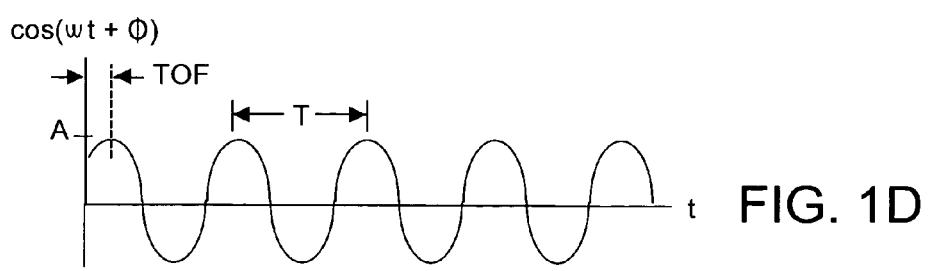
FIG. 1D depicts the return waveform with phase-delay for the transmitted signal of FIG. 1C, according to the prior art.
Figure 2A:
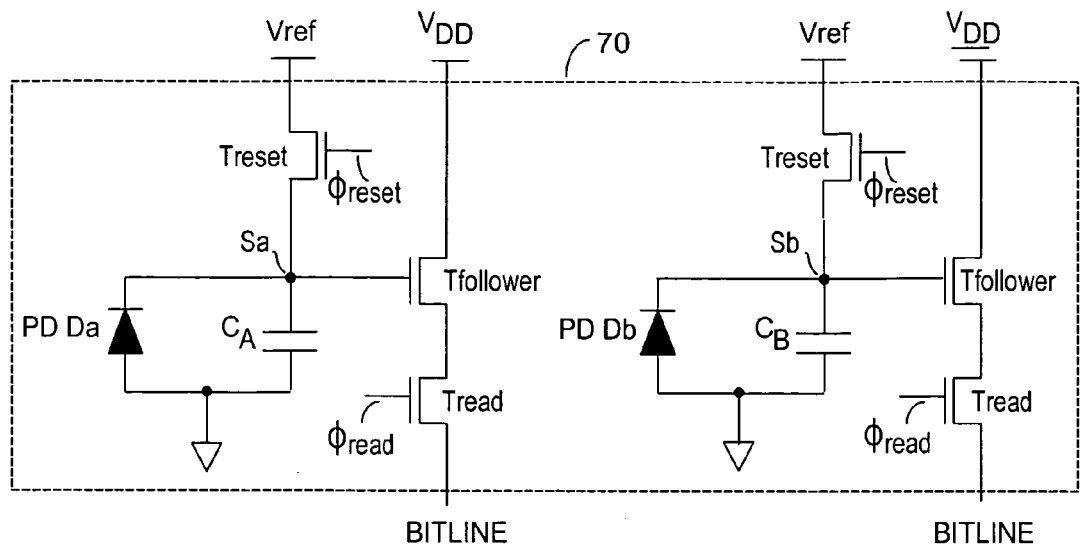
FIG. 2A depicts a conventional differential pixel detector.
Figure 2B:
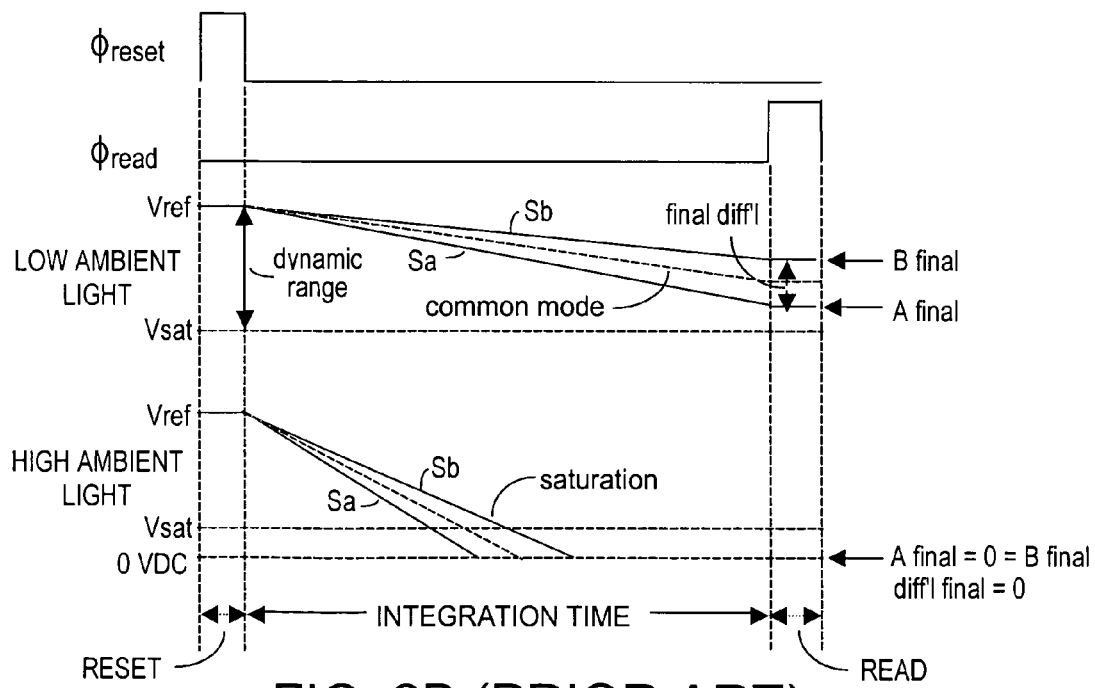
FIG. 2B depicts waveforms present in the detector of FIG. 2A showing the saturation effects of high ambient light.

Referring briefly to FIG. 1B, optical energy source 120 typically outputs a pulse train of optical energy, which energy may be modulated, for example according to the '496 patent. The pulse train will have a period between adjacent output pulses. Within differential detector 70', the maximum period of integration is made less than the period between adjacent pulses of optical energy emitted by source 120. Referring back to FIGS. 3A and 3B, in the present of strong ambient light, sunlight perhaps, during integration the voltage at node $S_A$ across $C_A$ continues to decrease in magnitude until $V_{sat}$ is reached. At that moment, comparator 140 changes states, emitting a short output pulse that is present at node P. This pulse turns-on reset transistor $T_{reset}$ for a short time, causing $C_A$ to be again reset to voltage $V_{ref}$. Such reset is self-triggering, and can occur multiple times during the integration interval. The total number of such resets is recorded by counter 150, there being one counter for each of the two photodiode detectors in a differential pixel detector 70'.

At the end of the integration time, the counter value (n) and the final voltage $V_{final}$ on capacitor $C_A$ are read-out separately by turning-on $T_{readD}$ and $T_{readA}$, respectively. FIG. 3A is conceptual in that while counter 150 is shown being read-out as though its counter n were an analog value, in practice the digital counter will be read-out with a bus. The signal waveforms for node $S_A$ and the comparator output at node P are shown in FIG. 3B. Note that the effective voltage swing on node $S_A$ is $V_{swing} = n(V_{ref} - V_{sat}) + V_{final}$, which is n times larger than the maximum voltage swing $(V_{ref} - V_{sat})$ of known differential sensors. Thus using the self-resetting configuration of FIG. 3A, capacity is extended by n times, where n is the number of self-resets occurring during integration. The resultant extended maximum charge capacity for the photodiode enables the pixel sensor to detect differential mode signals even in the present of very strong ambient light.

Figure 3C:
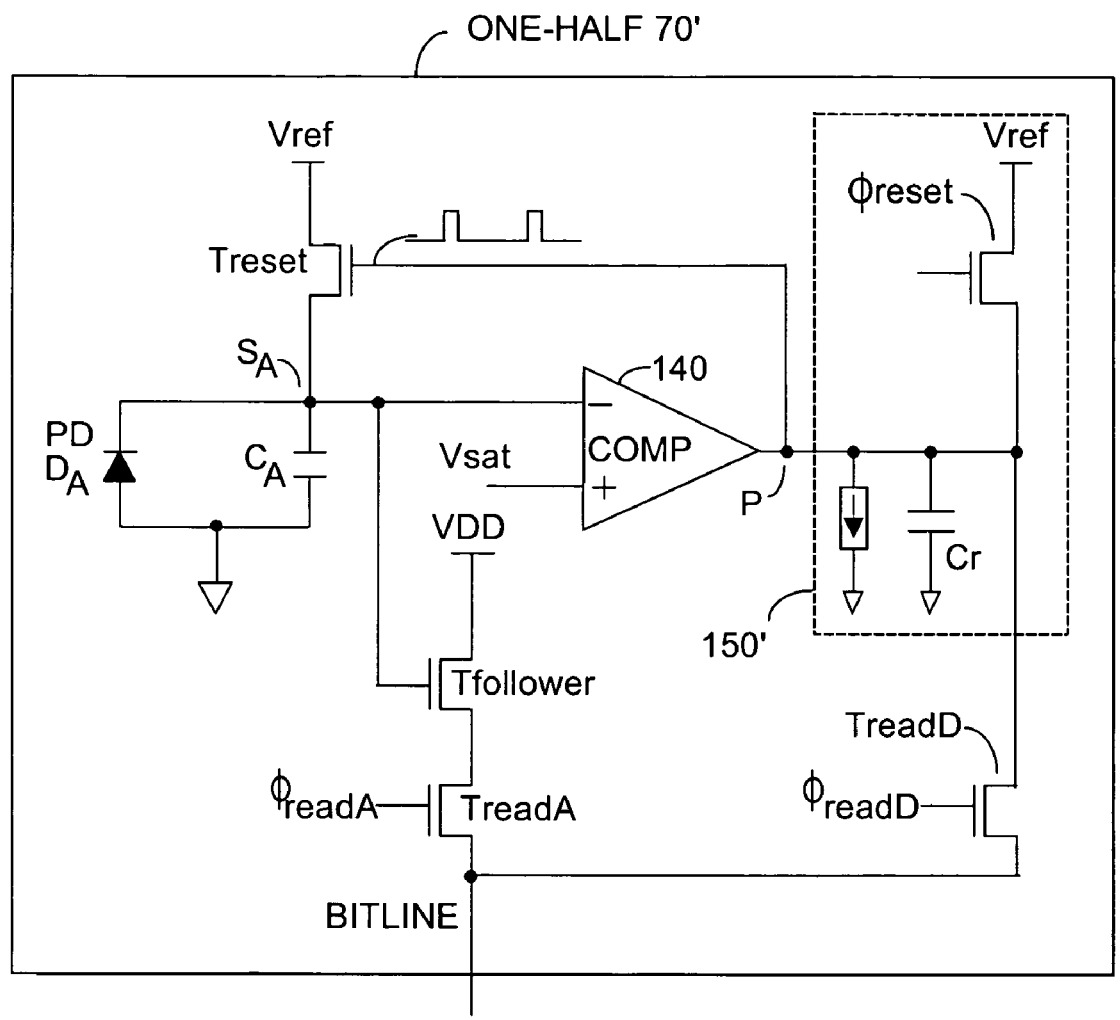
FIG. 3C depicts one-half of a self-resetting differential pixel detector implemented with an analog counter, according to an embodiment of U.S. Pat. No. 6,919,549, from which priority is claimed.

While FIG. 3A has been described with respect to use of a counter 150 that operates digitally, the role of counter 150 can instead be implemented in analog fashion. FIG. 3C depicts such an implementation, in which an analog charge pump products an analog voltage value proportional to n. Such an analog circuit can be implemented using small area on an IC, e.g., IC 30' in FIG. 1B, where conventional detectors 70 are replaced by detectors 70' according to the '549 patent.

In FIG. 3C, a current source changes voltage across a capacitor $C_r$, where each time a reset pulse (of fixed duration) is generated by comparator 140, the current source is turned on. Thus for each comparator reset pulse, a fixed amount of charge is injected into capacitor $C_r$, altering the voltage across the capacitor by $\Delta V_r$. At the end of the integration time, the voltage on capacitor Cr changes by an amount equal to $\Delta V_r$ times the number of reset pulses n that occurred during integration. It is possible to determine n by $n = (V_{ref} - V_r)/\Delta V_r$. Note that capacitor $C_r$ is also initialized to $V_{ref}$ when the photodetector is initialized. If desired, an initial voltage other than $V_{ref}$ could be used for capacitor $C_r$.

In FIG. 3C, photodetector $D_A$ can be reset by using the non-inverting input of comparator 140, which input normally is set to $V_{sat}$. But this non-inverting input can be used to perform an initial (frame) reset before integration. For example, during the initial reset period this input can be switched to $V_{DD}$, which will cause the comparator to output a pulse at node P that resets $T_{reset}$ and thus resets photodetector $D_A$ and its associated capacitor $C_A$. Thereafter the non-inverting node of comparator 140 can be returned to $V_{sat}$ to remain at that potential until the next (frame) reset. By judiciously making voltage $V_{sat}$ low, all photodetectors are simultaneously reset, thus removing the need for a separate reset signal.

Figure 4A:
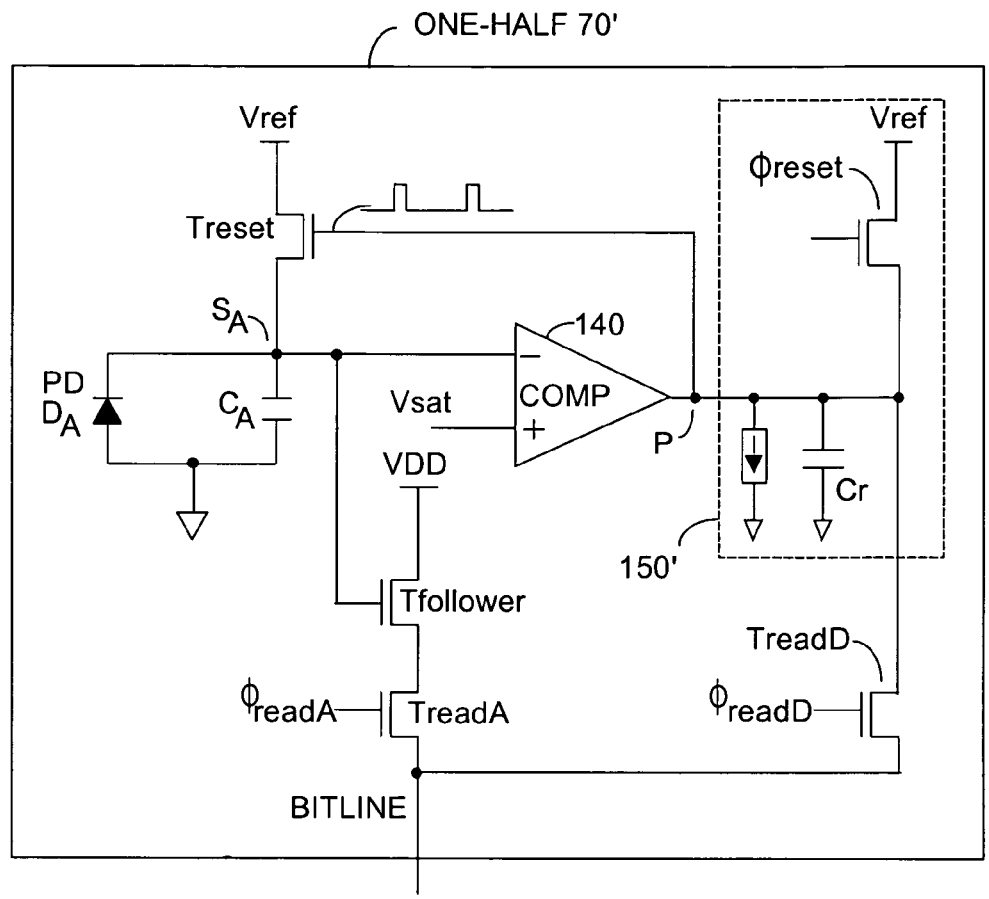
FIG. 4A depicts one-half of a self-resetting differential pixel detector using an analog counter with reset, according to an embodiment of U.S. Pat. No. 6,919,549, from which priority is claimed.
Figure 4B:
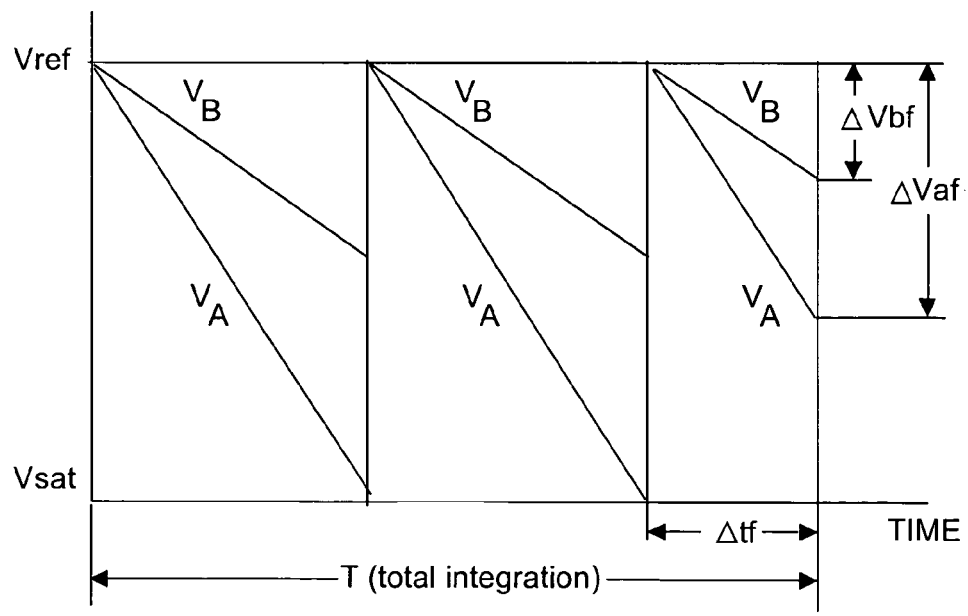
FIG. 4B depicts waveforms for a differential time to saturation counter as shown in FIG. 4A.

Turning now to FIGS. 4A and 4B, an embodiment of a differential comparator is described in which a differential time to saturation counter is employed. In the block diagram of FIG. 4A a single detector PD $D_A$ is shown, although it is understood that a complete differential pixel detector 70' will comprise two detector diodes (or the like), two comparators, a counter, and associated reset and read-out transistors. In FIG. 4A, while counter 150' is shown implemented with analog components, a counter could instead be implemented to function digitally.

At start of integration, counter 150' starts counting to measure the time since the last reset to $V_{ref}$. In the following discussion it will be assumed that the magnitude of incoming ambient light does not change substantially during the integration time. Two scenarios will be considered: ambient light is strong, and ambient light is not very strong.

If the ambient light is strong, each photodetector $D_A$ and $D_B$ ($D_B$ not shown) will reach $V_{sat}$ multiple times during one integration period. In this case, every time either photodetector reaches $V_{sat}$, the photodetectors and counter 150' are simultaneously reset. At the end of the integration period, each photodetector will be at a determinable voltage level, which level will likely be different for each detector. Further, at the end of the integration period, the counter will have stored the time ($\Delta tf$) since the last reset required for the photodetectors to attain these final voltage levels. Since each photodetector end-of-integration voltage level is known, as is the time $\Delta tf$, the slope of the voltage curves for each photodetector and the number of resets that should have occurred during integration can be determined; see FIG. 4B. Note at the right-hand side of FIG. 4B that the final photodiode voltages are $(V_{ref} - \Delta V_{af})$ and $(V_{ref} - \Delta V_{bf})$ for photodiodes $D_A$ and $D_B$ respectively. Subtracting these magnitudes from $V_{ref}$ yields $\Delta V_{af}$ and $\Delta V_{bf}$. The total swing can be calculated as follows:

$$V_{swing-a} = \Delta V_{af} \cdot T/\Delta tf \qquad \text{eq. (3):}$$

$$V_{swing-b} = \Delta V_{bf} \cdot T/\Delta tf \qquad \text{eq. (4):}$$

where T is the total integration time, which is known.

If the ambient light is not strong, at the end of the integration time T, the counter value will be equal to the integration time, and the voltages across the photodiodes $D_A$ and $D_B$ will represent all that the photocharge each pixel could collect during the whole integration time. In this case, no further calculation is needed to determine the total voltages, since it follows from $T = \Delta tf$ that:

$$V_{swing-a} = \Delta V_{af} \qquad \text{eq. (5):}$$

$$V_{swing-b} = \Delta V_{bf} \qquad \text{eq. (6):}$$

Once the relevant times and photodiode voltages are read-out, an external computation unit, perhaps microprocessor 90 in system 10 (see FIG. 1) or pure logic circuitry can calculate to provide the differential signal.

As noted, in FIG. 4A an analog equivalent of a digital resettable counter 150' is used, in which a charge pump can be used to measure $\Delta tf$. A charge pump capacitor $C_r$ is reset by transistor $Tc_{rreset}$ each time photodiode voltage reaches $V_{sat}$. Thus at the end of time T, the voltage on $C_r$ is proportional to the time from the last reset to the end of integration. Assuming the constant current supplied to $C_r$ is $I_r$, then the final voltage on $C_r$ will be $V_r = V_{ref} - I_r \cdot \Delta tf / C_r$ and $\Delta tf$ can be determined as $\Delta tf = (V_{ref} - V_r) \cdot C_r / I_r$. In the above descriptions, two independent counters are present. However since only the counter causing the most recent reset is of use, both counters can be combined into a single counter.

This single counter and the reset for both halves of the pixel detector could be controlled by the logical OR of both comparators.

As noted, capacitor $C_r$ is initialized at the beginning of integration along with the photodetector. As with the self-reset method, the non-inverting input of comparator 140 may be switched to $V_{DD}$ (rather than to $V_{sat}$ during integration) to reset pixel 70' (e.g., both photodetectors and $C_r$). By judiciously making voltage $V_{sat}$ low, all photodiodes are simultaneously reset, thus removing the need for a separate reset signal.

Figure 5A:
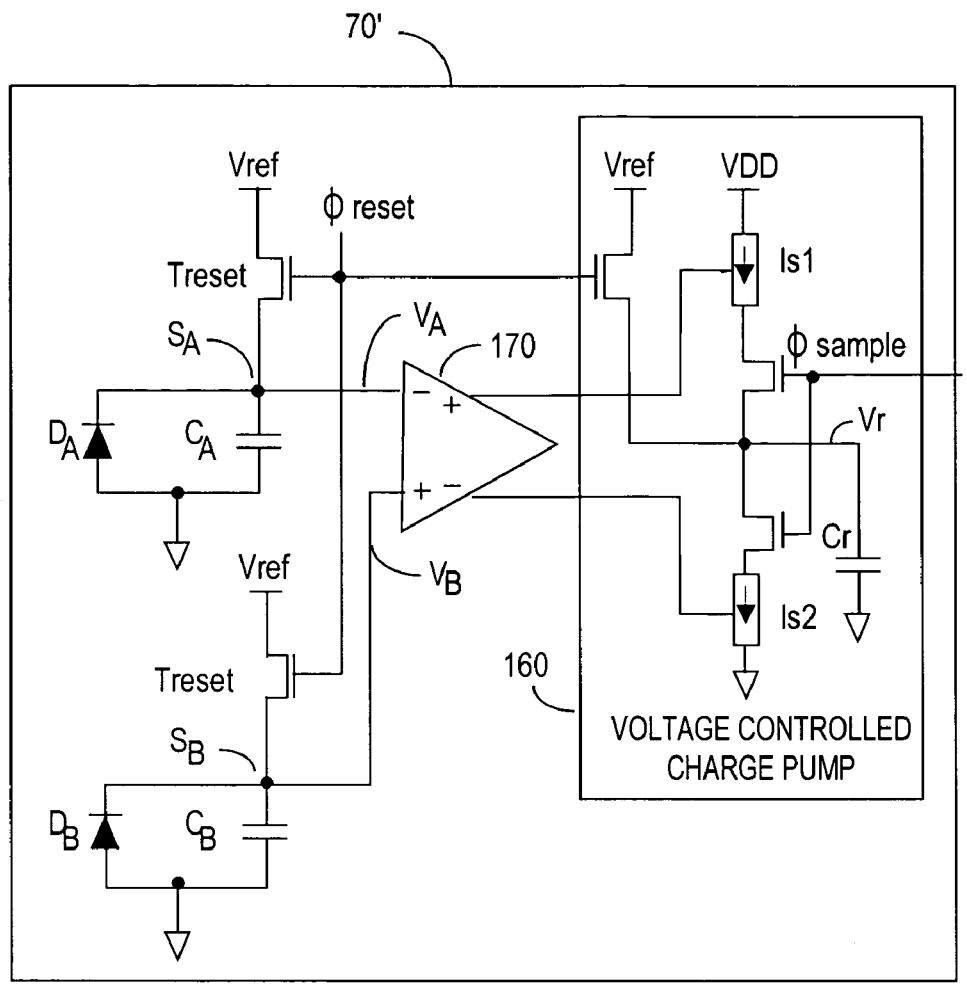
FIG. 5A depicts a differential pixel detector using a controlled charge pump, according to an embodiment of embodiment of U.S. Pat. No. 6,919,549, from which priority is claimed.
Figure 5B:
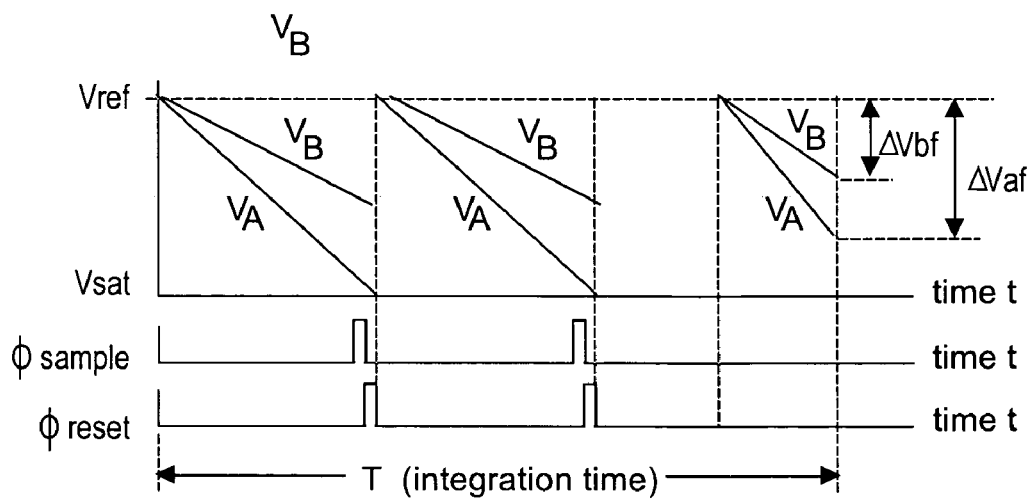
FIG. 5B depicts waveforms present in the detector of FIG. 5A.

Turning now to FIGS. 5A and 5B an embodiment is shown in which differential pixel detector 70' includes a voltage controlled charge pump 160 to record voltage difference between the two differential photodetectors $D_A$ and $D_B$ before they are saturated by high common mode signal. Once the photodetector voltage difference has been recorded on a third capacitor $C_r$, photodetectors $D_A$ and $D_B$ and their associated capacitors ($C_A$, $C_B$) can be reset by the relevant reset transistors, and integration starts again.

In FIG. 5A, charge pump 160 includes two voltage controlled current sources $I_{s1}$, $I_{s2}$ and a capacitor $C_r$. Although the voltage difference between photodetectors $D_A$ and $D_B$ may be monitored continuously by differential amplifier 170, charge pump 160 is only turned-on for a fixed period of time. In this fashion, charge accumulated on capacitor $C_r$ during each sample is proportional to the voltage difference. After each sample, the differential photodetector is reset and a new integration cycle starts. The sampling frequency preferably depends upon incoming light intensity, e.g., optical energy falling upon photodetectors $D_A$ and $D_B$, which intensity can be estimated. The final charge on $C_r$ is the summation of the samples and is proportional to the total voltage difference between the differential photodetectors. FIG. 5B depicts control signal and voltage waveforms at various nodes in the configuration of FIG. 5A.

At the end of integration, three voltage values are read-out from pixel 70', namely $V_a$ (voltage across $D_A$), $V_b$ (voltage across $D_B$), and $V_r$ (voltage across capacitor $C_r$). Given these quantities, one can calculate the resulting differential voltage $V_{swing-a} - V_{swing-b}$ as follows. Looking at FIG. 5B, it is seen that $\Delta V_{af} = V_{ref} - V_a$ and that $\Delta V_{bf} = V_{ref} - V_b$. The differential voltage is then given by $V_{swing-a} - V_{swing-b} = \Delta V_{af} - \Delta V_{bf} + f(V_r)$, where $f(V_r)$ is a linear function of $V_r$.

This linear function $f(V_r)$ is obtained by writing $V_r$ as $V_r = V_{ref} + n \cdot k \cdot (V_a - V_b)$. As noted, $V_{ref}$ is the initial voltage for capacitor $C_r$ (e.g., the reset voltage for photodetectors $D_A$, $D_B$), n is the number of sample/reset cycles, and k is a constant determined from the circuit of FIG. 4A, and represents how much voltage change occurs on $C_r$ for given a unit voltage change in $(V_a - V_b)$. The amount contributing to $V_{swing-a} - V_{swing-b}$ is $n \cdot (V_a - V_b)$, which is equal to $n \cdot (V_a - V_b) = (V_r - V_{ref})k = f(V_r)$. In summary the final differential voltage is calculated from known quantities, according to $V_{swing-a} - V_{swing-b} = V_b - V_a + (V_r - V_{ref})/k$. Common mode voltage can also be estimated from $\Delta V_{af}$ and $\Delta V_{bf}$ since the time between the last reset and the end of integration is known.

It is possible to automatically generate the $\Delta_{sample}$ or $\Delta_{reset}$ signals within each pixel 70', by providing some additional circuitry. One can use two comparators to compare $S_A$, $S_B$ node potentials with $V_{sat}$, and the logical OR can be taken of the comparator outputs to yield the $\Delta_{sample}$ signal. Thus as soon as either photodiode potential reaches $V_{sat}$, $\Delta_{sample}$ goes high. If desired, $\Delta_{reset}$ can be a delayed version of $\Delta_{sample}$. Such a self-resetting configuration would use two comparators, an OR gate, and a delay element that could be a simple RC delay.

Figure 6A:
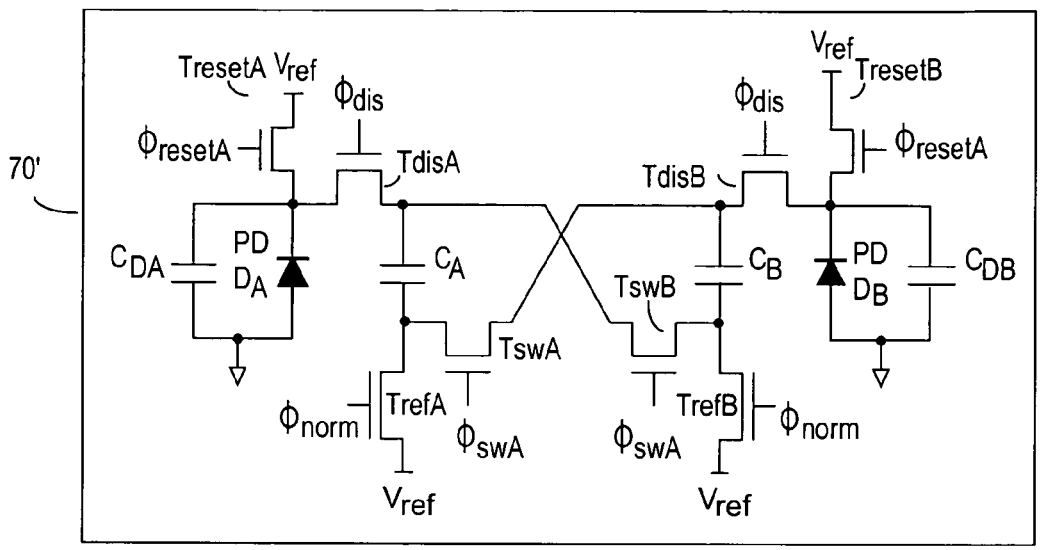
FIG. 6A depicts a common mode resettable differential pixel detector, according to an embodiment of embodiment of U.S. Pat. No. 6,919,549.

Turning now to FIG. 6A, an embodiment of a differential pixel detector 70' is shown in which during reset operation capacitors acquire exactly the same charge in each half of the configuration. By adding exactly the same charge to each half of the configuration, common mode contribution is essentially removed and differential mode contribution is preserved. Such an approach offers several advantages. For example, extra resets do not affect the system operation, and the pixel detector may be reset even if it is not discharged. Further, capacitor or component mismatch has substantially no effect on the accuracy of the reset. In addition, it can be shown that common mode reset generates no KT/C noise in the differential domain. The only resulting KT/C contribution appears in common mode where it is unimportant.

For ease of illustration, FIG. 6A does not depict $Q_A$, which is the sum of the charge on the top plate of capacitors $C_A$ and $C_{DA}$, or $Q_B$, which is the sum of the charge on the top plate of capacitors $C_B$ and $C_{DB}$. In operation, the configuration of FIG. 6A preserves the differential quantity $Q_A - Q_B$ during the common mode reset operation, although the common mode quantity, $(Q_A + Q_B)/2$, is changed at each reset. What occurs is that after a reset, the quantity $(Q_A + Q_B)/2$ is moved closer to some constant $Q_{reset0}$. Thus in contrast to other reset approaches, additional resets have no adverse impact in FIG. 6A as they simply move the operating point for $(Q_A + Q_B)/2$ even closer to $Q_{reset0}$.

In normal operation switching transistors $T_{swA}$ and $T_{swB}$ are open, while transistors $T_{vrefA}$ and $T_{vrefB}$, and $T_{disA}$ and $T_{disB}$ are closed. Initially photodetector diodes $D_A$ and $D_B$ are reset to $V_{ref}$ via transistors $T_{resetA}$ and $T_{resetB}$, but during integration transistors $T_{resetA}$ and $T_{resetB}$ remain open. As optical energy impinges on photodiode $D_A$ it discharges its parasitic capacitor $C_{DA}$ as well as capacitor $C_A$, while photodiode $D_B$ discharges its parasitic capacitor $C_{DB}$ as well as its capacitor $C_B$. Initial reset is achieved though transistors $T_{resetA}$ and $T_{resetB}$, which initialize the circuit at potential $V_{ref}$, although other potential levels may instead be used.

Figure 6B:
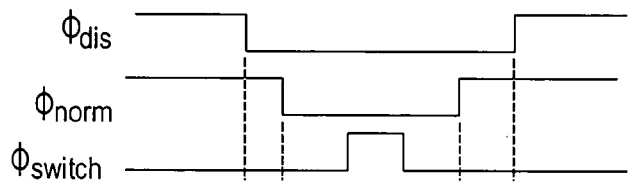
FIG. 6B depicts control waveforms present in the detector of FIG. 6A.

During common mode reset, signal $\Phi_{resetA}$ remains low, while the other control signals operate as shown in FIG. 6B. During operation of pixel 70', the following steps take place:

(1) First, capacitors $C_A$ and $C_B$ are decoupled from associated photodiodes $D_A$ and $D_B$ by bring the $\Phi_{dis}$ signal low, which opens discharge transistors $T_{disA}$ and $T_{disB}$ going low. This operation does not change the differential charge quantity $Q_A - Q_B$, and no KT/C noise is introduced on $Q_A - Q_B$.

(2) Next, when control signal $\Phi_{norm}$ goes low, the bottom plates of capacitors $C_A$ and $C_B$ are decoupled from $V_{ref}$ by the opening of transistors $T_{refA}$ and $T_{refB}$. The quantity $Q_A - Q_B$ remains unaffected, even in terms of KT/C.

(3) When the control signal $\Phi_{switch}$ goes high, capacitors $C_A$ and $C_B$ redistribute their charge. Let $Q_{CA}$ be the charge on capacitor $C_A$ and let $Q_{CB}$ be the charge on capacitor $C_B$. If capacitors $C_A$ and $C_B$ are now shorted together in parallel the total charge quantity $Q_{CA} + Q_{CB}$ would be preserved. However since $C_B$ is connected to $C_A$ inverted, the quantity $Q_{CA} - Q_{CB}$ is preserved during this operation. Since no switches are opened no KT/C arises from this step.

(4) When the control signal $\Phi_{swA}$ goes low; a KT/C uncertainty appears in the charge redistribution, but this KT/C appears as common mode on the quantities $Q_{CA}$ and $Q_{CB}$. Any charge taken from $Q_{CA}$ shows up exactly on $Q_{CB}$ but with a minus sign. Thus after switches $T_{swA}$ and $T_{swB}$ open, $Q_{CA}' = Q_{CA} + \text{Noise}_{KTC}$, and $-Q_{CB}' = -Q_{CB}' - \text{Noise}_{KTC}$. Thus there is no KT/C noise on $Q_{CA}' - Q_{CB}' = Q_{CA} - Q_{CB} + (\text{Noise}_{KTC} - \text{Noise}_{KTC})$.

(5) Next, when control signal $\Phi_{norm}$ goes high again the differential charge $Q_A - Q_B$ is unchanged.

(6) Finally, when control signal $\Phi_{dis\ goes}$ high, $Q_A$–$Q_B$ is unchanged.

If desired some of the above steps may be combined for simplicity. For example steps 5 and 6 may occur simultaneously or even out of sequence. Steps 1,2 and 5,6 clearly do not affect $Q_A$–$Q_B$, and it was demonstrated that steps 3 and 4 do not affect $Q_{CA}$–$Q_{CB}$. Thus, steps 1 through 6 do not affect $Q_A$–$Q_B$. In operation, the generation of the various control signals can be handled by microprocessor 160 in system 10 in FIG. 1B, where it is understood that array will comprise differential pixels 70'.

Note that no assumption as to closeness of component matching was made in the above analysis, and the conclusions reached remain irrespective of the values of capacitors $C_A$, $C_B$, $C_{DA}$, and $C_{DB}$. Additionally the linearity of the capacitors does not affect performance, and the configuration shown in FIG. 6A will function with capacitors that are mismatched or even nonlinear.

Consider now the common mode voltage on photodiodes $D_A$ and $D_B$ after reset. Within reasonable bounds, the exact value of the common mode voltage is not critical. Although an analysis can be carried out for almost any capacitor values, for simplicity of explanation let it be assumed that $C_A = C_B$ and $C_{DA} = C_{DB}$.

Since it is small, let KT/C reset noise be ignored. Thus after step 5 if $V_{CA}$ (the voltage across capacitor $C_A$) and if $V_{CB}$ (the voltage across capacitor $C_B$) have the relation $V_{CA} = -V_{CB}$, the voltage on the top plate of $C_A$ is $(V_{ref} + V_{CA})$ and the voltage on the top plate of $C_B$ is $(V_{ref} - V_{CA})$.

As noted, charge difference $Q_A$–$Q_B$ is preserved in the configuration of FIG. 6A. Assuming that $C_A = C_A$ and $C_{DA} = C_{DB}$ it can be shown that the voltage difference $V_{DA} - V_{DB}$ on the photodiodes is also preserved, and that is voltage is $V_{DA} - V_{DB} = 2V_{CA} = -2V_{CB}$, after step 5. Thus following step 5, $V_{DA}$ and $V_{DB}$ must differ from the top plate voltages on capacitors $C_A$ and $C_B$ by only a constant K.

$$V_{DA} = V_{ref} + V_{CA} + K \quad \text{eq. (7):}$$

$$V_{DB} = V_{ref} + V_{CB} + K = V_{ref} - V_{CA} + K \quad \text{eq. (8):}$$

$$V_{DA} + V_{DB} = V_{ref} + V_{CA} + K + V_{ref} - V_{CA} + K = 2(V_{ref} + K) \quad \text{eq. (9):}$$

After step 6 because of charge redistribution the new voltages are:

$$V_{DA}' = [C_{DA} \cdot V_{DA} + C_A \cdot (V_{ref} + V_{CA})]/(C_{DA} + C_A) \quad \text{eq. (10):}$$

$$= [C_{DA} \cdot (V_{ref} + V_{CA} + K) + C_A \cdot (V_{ref} + V_{CA})]/(C_{DA} + C_A) \quad \text{eq. (11):}$$

$$= [(V_{ref} + V_{CA}) + C_{DA} \cdot K/(C_{DA} + C_A)], \text{ and} \quad \text{eq. (12):}$$

$$V_{DB}' = [C_{DB} \cdot V_{DB} + C_B \cdot (V_{ref} + V_{CB})]/(C_{DB} + C_B) \quad \text{eq. (13):}$$

$$= [C_{DB} \cdot (V_{ref} + V_{CB} + K) + C_B \cdot (V_{ref} + V_{CB})]/(C_{DB} + C_B) \quad \text{eq. (14):}$$

$$= [(V_{ref} + V_{CB}) + C_{DB} \cdot K/(C_{DB} + C_B)] \quad \text{eq. (15):}$$

$$= [(V_{ref} - V_{CA}) + C_{DA} \cdot K/(C_{DA} + C_A)] \quad \text{eq. (16):}$$

Thus the sum $V_{DA}' + V_{DB}'$ then becomes eq. (17):

$$V_{DA}' + V_{DB}' = [(V_{ref} + V_{CA}) + C_{DA} \cdot K/(C_{DA} + C_A)] + \\ [(V_{ref} - V_{CA}) + C_{DA} \cdot K/(C_{DA} + C_A)] = 2 \cdot [V_{ref} + K \cdot C_{DA}/(C_{DA} + C_A)]$$

Thus the sum $V_{DA}' + V_{DB}'$ is advantageously always closer to $2V_{ref}$ than to $V_{DA} + V_{DB}$. This demonstrates that with each reset in FIG. 6A, the common mode is brought closer to $V_{ref}$ by $K \cdot [1 - C_{DA}/(C_{DA} + C_A)] = K \cdot C_A/(C_{DA} + C_A)$.

Figure 6C:
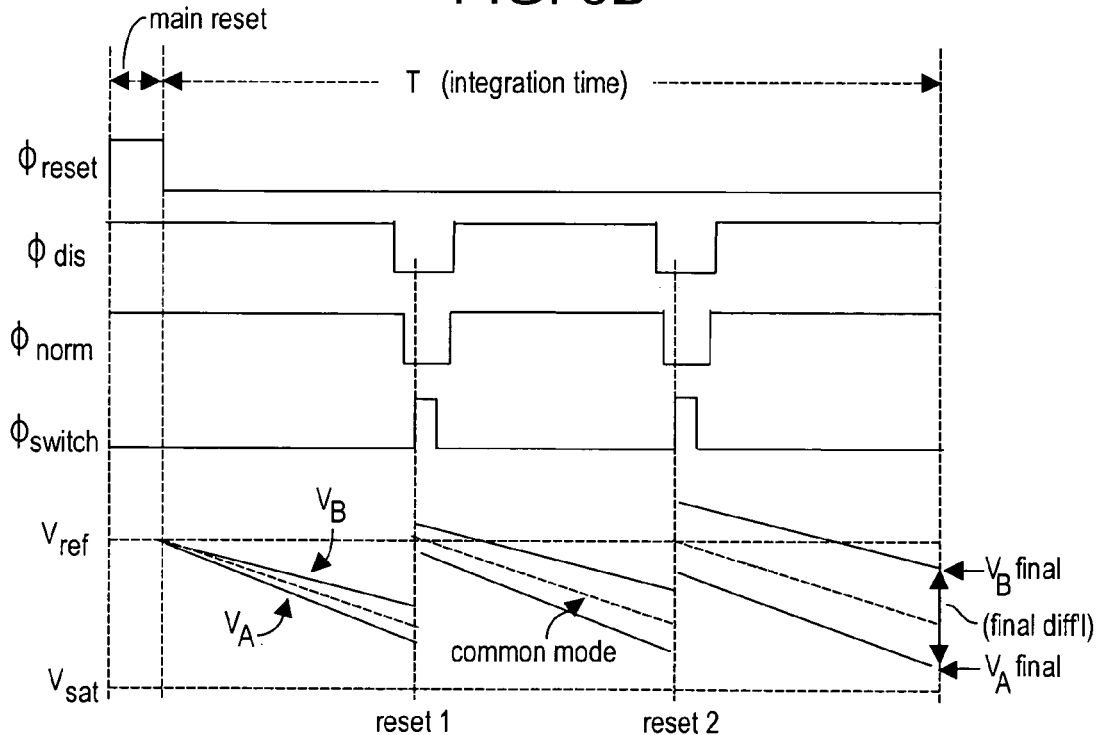
FIG. 6C depicts waveforms present in the detector of FIG. 6A over a two reset sequence, according to an embodiment of embodiment of U.S. Pat. No. 6,919,549.

To recapitulate, for the embodiment of FIG. 6A, reset operation has the desired effect of centering the common mode about $V_{ref}$. Relevant waveforms for FIG. 6A are shown in FIG. 6C. As a consequence, a reset can be applied without consideration of over-saturating or under-saturating the common mode for the pixel configuration. Thus in normal operation, reset can occur as often as desired without concern as to ill effects resulting from over or under saturation of the common mode.

Transistors $T_{disA}$ and $T_{disB}$ can be used as global shutters, thereby improving resilience to ambient light by stopping the effects of all light impinging on the differential pixel when the shutter is turned off. When $T_{disA}$ and $T_{disB}$ are off, capacitors $C_a$ and $C_b$ are decoupled from photodetectors $PD_{DA}$ and $PD_{DB}$ and therefore stop integrating the signal from $PD_{DA}$ and $PD_{DB}$. If the output of the pixel is chosen to be top plate of capacitors $C_A$ and $C_B$ then the output of the pixel will be frozen after $T_{disA}$ and $T_{disB}$ are turned-off, thereby providing the function of a global shutter.

Figure 6D:
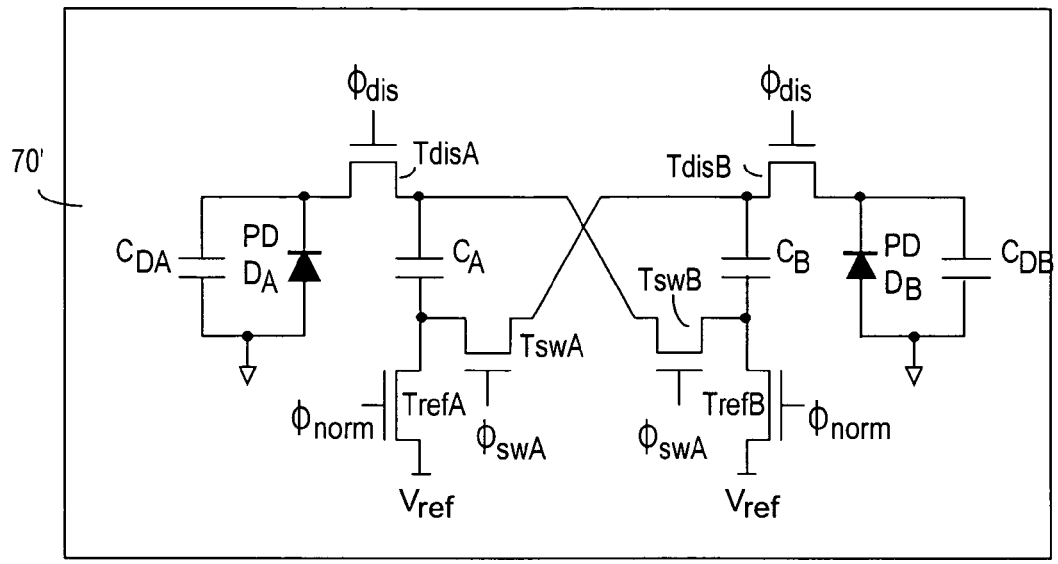
FIG. 6D depicts another configuration of a common mode resettable differential pixel detector, according to an embodiment of embodiment of U.S. Pat. No. 6,919,549.

FIG. 6D depicts another embodiment of a capacitor common mode reset configuration for pixel 70', whose basic operation is as described for the configuration of FIG. 6A. However, in FIG. 6D, initialization of voltages $V_{DA}$ and $V_{DB}$ across photodiodes $D_A$, $D_B$ respectively at the beginning of integration does not involve transistors $T_{resetA}$ and $T_{resetB}$ as was the case for the configuration of FIG. 6A. Instead, in FIG. 6D, reset is achieved by simultaneously turning-on transistors $T_{disA}$ and $T_{diSB}$ with high control signals $\Phi_{dis}$, turning-on transistors $T_{swA}$ and $T_{swB}$ with high control signal $\Phi_{sw}$, and by turning-off transistors $T_{vrefA}$ and $T_{vrefB}$ with low control signal $\Phi_{norm}$. This has the effect of resetting photodetectors $PDD_A$ and $PDD_B$ to $V_{ref}$. Note that transistors $T_{disA}$ and $T_{disB}$ may be used as global shutters in this configuration.

Figure 6E:
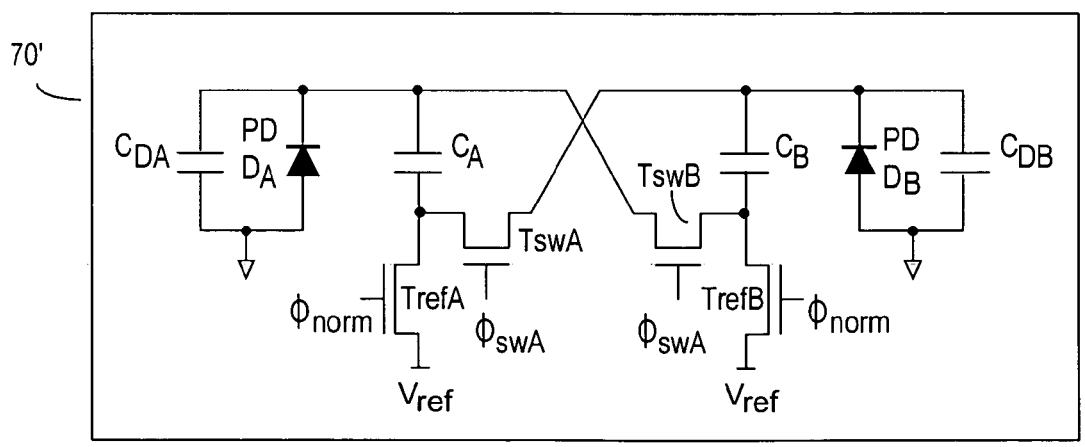
FIG. 6E depicts yet another configuration of a common mode resettable differential pixel detector, according to an embodiment of U.S. Pat. No. 6,919,549.

FIG. 6E depicts yet another embodiment for pixel 70', wherein discharge transistors $T_{disA}$ and $T_{disB}$ are eliminated. Indeed these discharge transistors could also be removed from the configurations of FIG. 6A and FIG. 6D. While these alternative configurations reduced common mode, unfortunately detector performance is diminished. This degradation results as each reset reduces some of the differential mode signal, and after a usually small number of resets, the differential signal is lost as a function of $C_{DA}/C_A$ and $C_{DB}/C_B$. Such embodiments may still find use in applications that do not require high precision, or where the number of resets is low, or where $C_{DA} << C_A$ and $C_{DB} << C_B$.

Figure 7A:
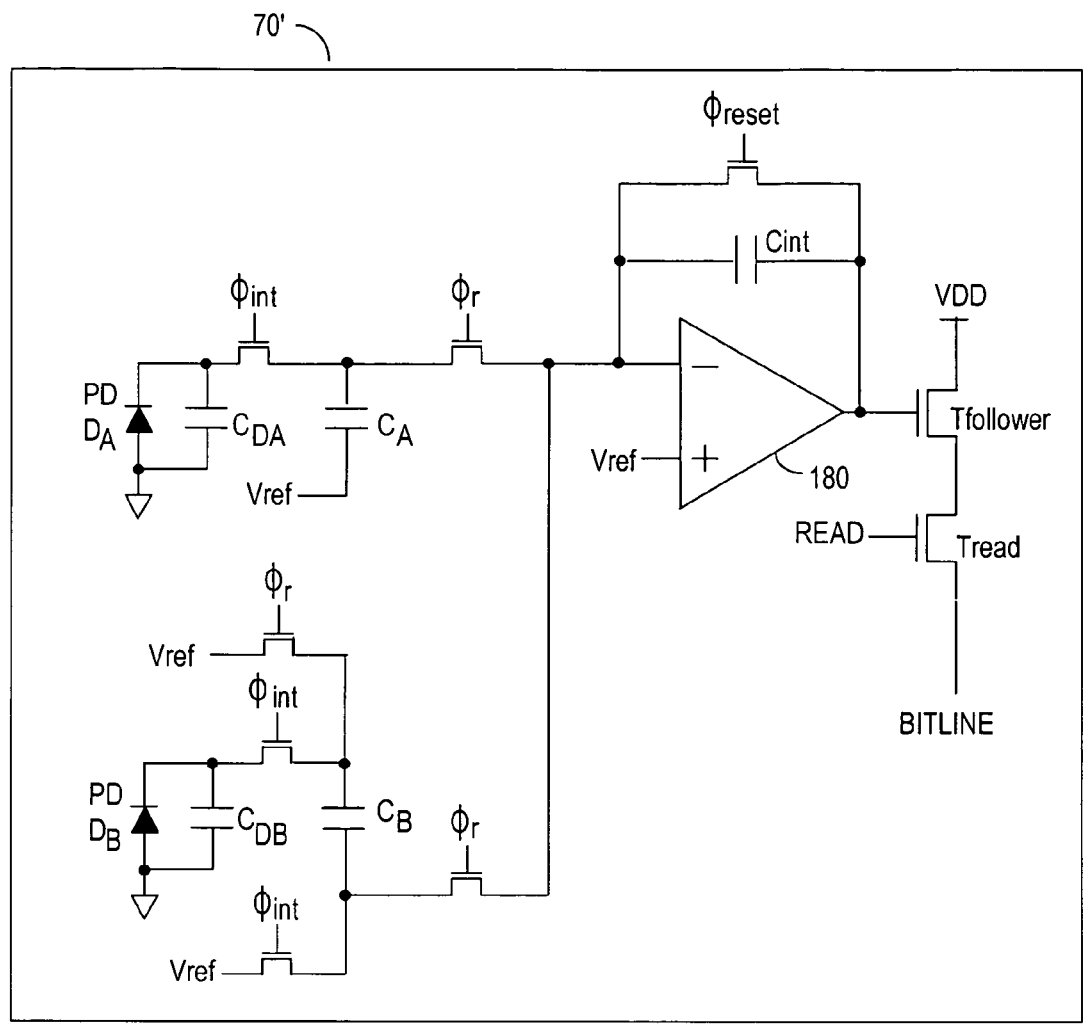
FIG. 7A depicts a common mode resettable differential pixel detector using charge integration, according to an embodiment of U.S. Pat. No. 6,919,549.
Figure 7B:
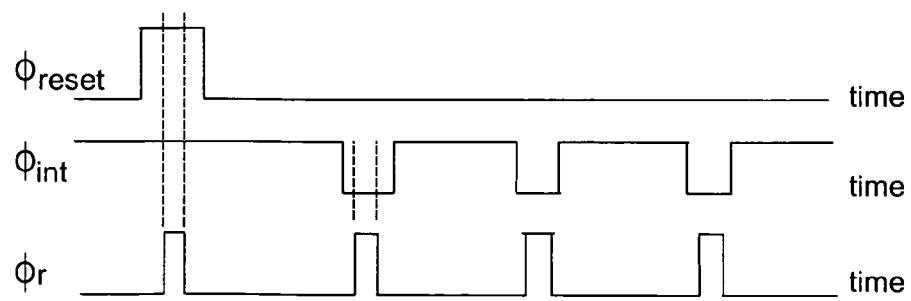
FIG. 7B depicts control waveforms for the embodiment of FIG. 7A.

Turning now to FIGS. 7A and 7B, a configuration and waveforms for a differential pixel detector 70' is shown in which a charge integrator is used for differential signal integration and common mode reset. Integration is carried out by integrator 180 and integration capacitor $C_{int}$. During an initial frame reset, transistors controlled by $\Phi_{reset}$, $\Phi_r$, and $\Phi_{int}$ signals are all turned-on, and the voltages on photodetectors $D_A$ and $D_B$ are reset to $V_{ref}$.

During integration, transistors controlled by signal $\Phi_{int}$ are turned-on and transistors controlled by signals $\Phi_r$, $\Phi_{reset}$ are turned-off. Thus during integration, light induced photocurrent discharges photodiode parasitic capacitance $C_{DA}$, $C_{DB}$, as well as capacitors $C_A$ and $C_B$. As has been noted, the integrated signals contain both differential mode and common mode components. FIG. 7B depicts various control voltage waveforms used in the embodiment of FIG. 7A.

Next, in a common mode reset phase, control signal $\Phi_{int}$ goes low, causing transistors $T_{int}$ to decouple $C_A$ from $C_{DA}$ and to decouple $C_B$ from $C_{DB}$. Then control signal $\Phi_r$ goes high, turning-on transistors $T_r$ and charge in both $C_A$ and $C_B$ transfers to the integration capacitor $C_{int}$. Note that polarities of the charge transferred onto $C_{int}$ are opposite due to the arrangement of the $T_r$ switches.

The integrated charge on $C_{int}$ after the common mode reset can be expressed in terms of charge on $C_{DA}$, $C_{DB}$ before the common mode reset as:

$$Q_{int} = Q_{C_{DA}} - Q_{C_{DB}} \qquad \text{eq. (18):}$$

Therefore the common mode signal is cancelled while the differential signal is preserved, which is the desired result.

Preferably common mode reset is performed multiple times and is interleaved with the integration during the whole frame integration. During integration, the integrating operational amplifier 180 may be turned off to save power. The total number of common mode reset performed will depend on the intensity of ambient light. The final signal readout is the accumulated charge (hence voltage) on $C_{int}$.

While the charge integrator in the embodiment of FIG. 7A used a single-ended operational amplifier 180, a fully differential operational amplifier could be used, among other types of integration configurations.

In the embodiment of FIG. 7A, each differential pixel (e.g., each $D_A$ and $D_B$ photodiode pair) has its own integrator, e.g., 180. In an alternative embodiment, one can implement only integration capacitor $C_{int}$ within each pixel, and share operational amplifier 180 as well as switches associated with connecting $C_{int}$ to amplifier 180 among multiple pixels. This approach would require fewer transistors per pixel, allowing a higher fill factor to be achieved on the integrated circuit containing the detector system.

Figure 8A:
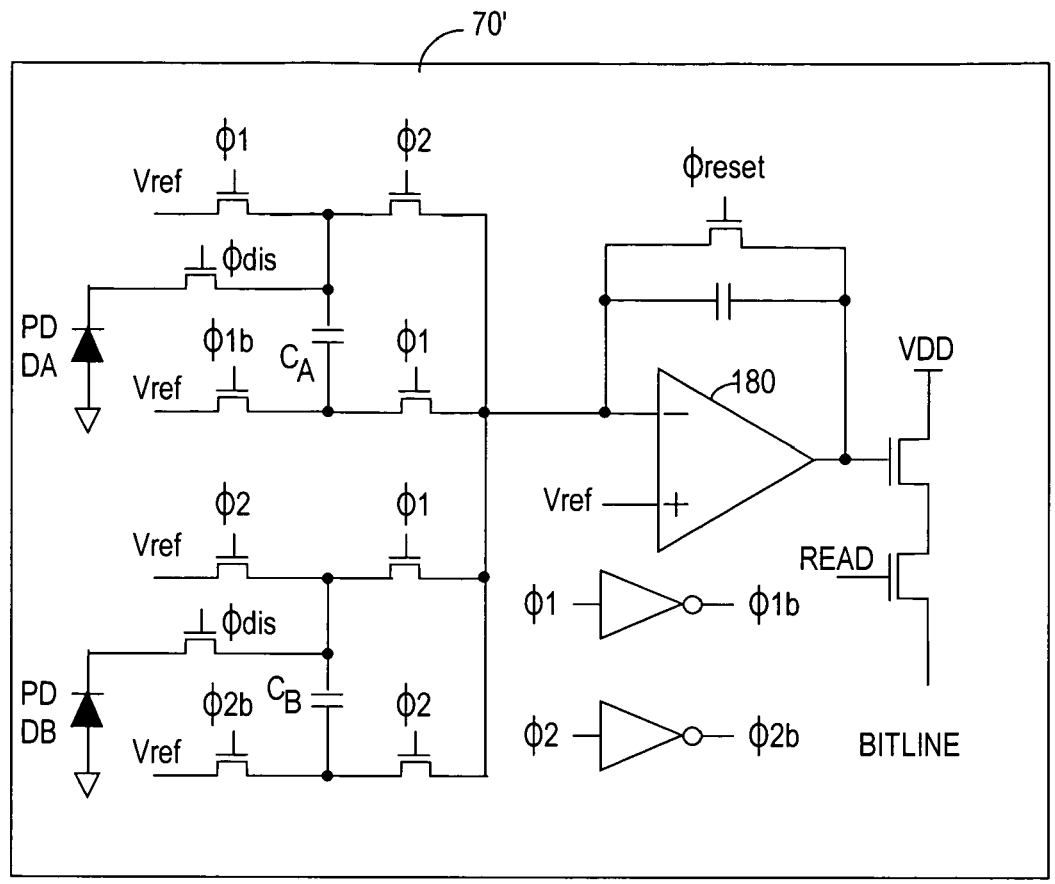
FIG. 8A depicts a common mode resettable differential pixel detector with component mismatch cancellation using charge integration, according to an embodiment of U.S. Pat. No. 6,919,549.

Turning now to FIG. 8A, an embodiment of a differential detector 170' is shown in which the common mode reset circuitry compensates for potential mismatch between components such as mismatched detector area between $D_A$ and $D_B$, mismatched tolerance between capacitors $C_A$ and $C_B$, as well as mismatched transistor sizes.

Figure 8B:
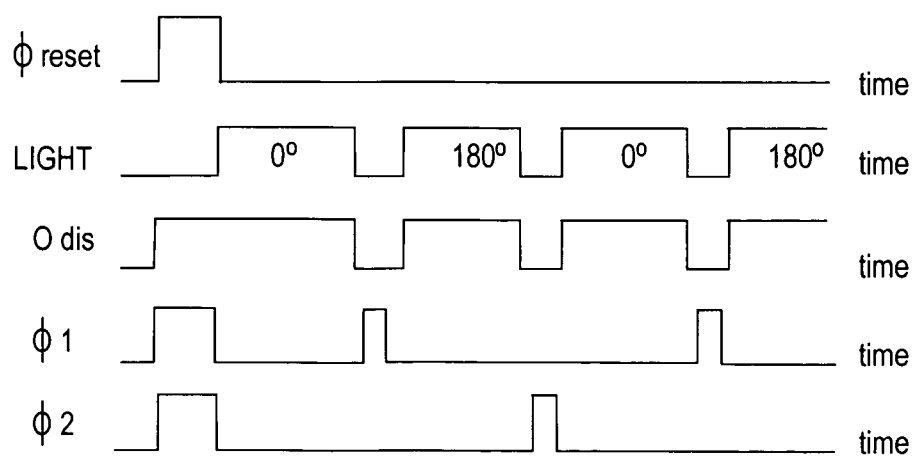
FIG. 8B depicts waveforms associated with the configuration of FIG. 8A.

FIG. 8B depicts control waveforms found in an alternate embodiment of FIG. 8A. In this alternate embodiment, as shown in FIG. 8B, the phase of the optical energy waveform from emitter 40 (LIGHT) alternates between 0° and 180° with respect to the phase of a signal used to modulate the photodetectors. Thus, rather than use fixed charge transfer polarity as in the embodiment of FIG. 7B, polarity between $D_A$ and $D_B$ is switched synchronously in time with modulation of the light emitted from system 10 towards target object 20. The accumulated charge on integration capacitor $C_{int}$ at the end of frame integration is expressed as:

eq. (19):
$$Q_{int} = (Q_{A,0}^1 - Q_{B,0}^1) + (Q_{A,180}^1 - Q_{B,180}^1) + (Q_{A,0}^2 - A_{B,0}^2) + (Q_{A,180}^2 - Q_{B,180}^2) + \ldots = \sum_{i=1}^{n/2}(Q_{A,0}^i - Q_{B,0}^i) + \sum_{i=1}^{n/2}(Q_{A,180}^i - Q_{B,180}^i)$$

where $Q_{A,0}$ represents the charge collected by detector $D_A$ with respect to 0° light phase, $Q_{B,0}$ represents the charge collected by detector $D_B$ with respect to 0° light phase, $Q_{A,180}$ represents the charge collected by detector $D_A$ with respect to 180° light phase, and $Q_{B,180}$ represents the charge collected by detector $D_B$ with respect to 180° light phase. As is apparent from the above equation, if the total number of common mode resets is n, then half of the final differential charge is collected from detector $D_A$ and half of the charge is collected from detector $D_B$. Another advantage of this embodiment is that KT/C noise associated with the transistor switches becomes common mode; therefore such noise is cancelled out from the final differential signal value.

Figure 9A:
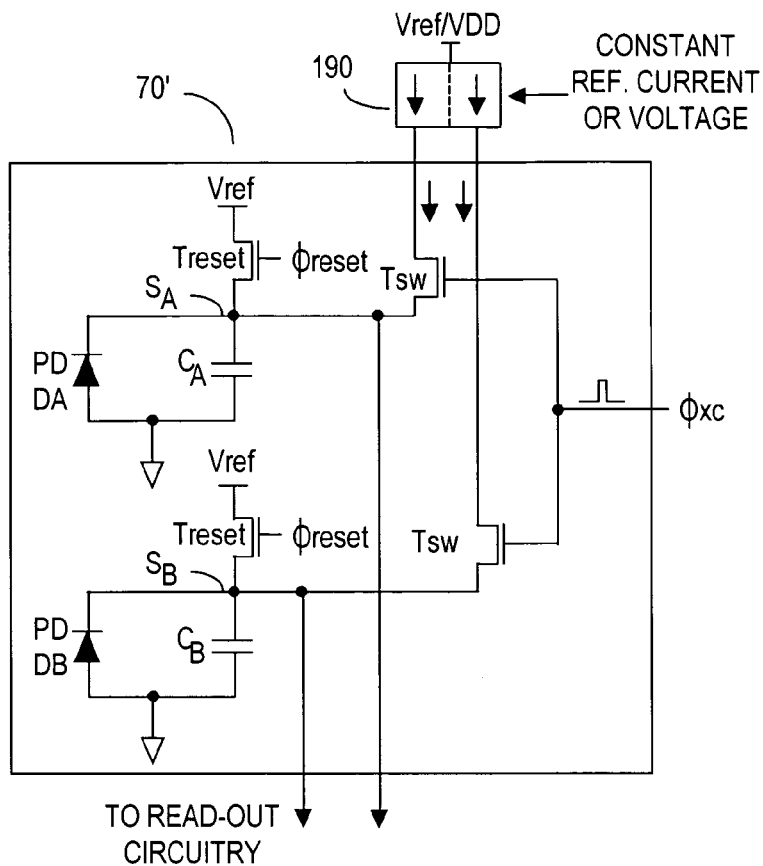
FIG. 9A depicts a resettable differential pixel detector implemented with VCCS/CCCS current mirror, and an external control signal, according to an embodiment of U.S. Pat. No. 6,919,549.

Most of the above-described embodiments accumulate the $D_A$–$D_B$ charge difference in a capacitor, and periodically reset $D_A$ and $D_B$ to $V_{ref}$ to avoid saturation. FIG. 9A depicts an alternative approach in which potentials $V_a$ and $V_b$ are increased by a fixed amount $\Delta V$ before these potentials drop below a certain level due to high-common mode light. This approach is somewhat analogous to the capacitor common mode reset embodiments that have been described. However the embodiment of FIG. 9A uses a separate circuit with an external current source 190.

In the embodiment of FIG. 9A, a periodic injection of a fixed amount of charge into detectors $D_A$ and $D_B$ occurs. The result is that while the differential $(D_A$–$D_B)$ charge does not change, the common mode of $D_A$ and $D_B$ is refreshed (i.e., decreased) to prevent photodetector saturation. An external current source 190 is required, which current source may be a reference Voltage Controlled Current Source (VCCS) or perhaps a reference Constant Current Controlled Current source (CCCS), in which case the current source becomes a current mirror.

Figure 9B:
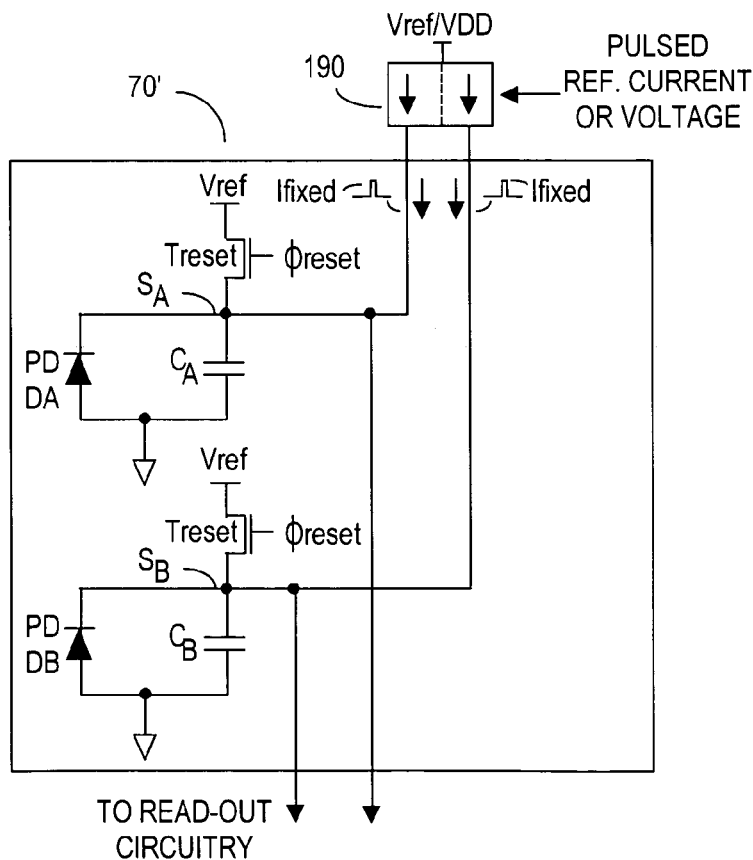
FIG. 9B depicts a resettable differential pixel detector implemented with VCCS/CCCS current mirror, and a pulsed reference input signal, according to an embodiment of U.S. Pat. No. 6,919,549.

The embodiment of FIG. 9A and the embodiment of FIG. 9B demonstrate two approaches to periodically refreshing charge into detectors $D_A$ and $D_B$. In FIG. 9A, current source 190 is always on, but switches Tsw responsive to an external signal $\Phi_{XC}$ are used to couple the constant current output by source 190 to nodes $S_A$ and $S_B$. During integration $\Phi_{XC}$ is periodically turned-on for a brief period of time to charge-up nodes $S_A$ and $S_B$, hundreds of nanoseconds perhaps.

In the embodiment of FIG. 9B, switches $T_{sw}$ are eliminated and instead the input current or voltage to current source 190 is itself pulsed. In essence rather than import a signal $\Phi_{XC}$, $\Phi_{XC}$ pulses are imported into current source 190 and result in current pulses of constant amplitude as shown.

FIG. 9C depicts waveforms for the configurations of FIGS. 9A and 9B. Note that advantageously the final differential voltage is simply $(V_A - V_B)$ and that no other computation need be done. The rate at which $\Phi_{XC}$ or the reference input to current count 190 will depend upon the common mode ambient light. A higher rate would be called for in the presence of very strong ambient light to keep source nodes $S_A$ and $S_B$ from saturating.

As noted, current source 190 may be controlled using a voltage reference or a current reference. If a voltage reference is used, the voltage can be $V_{DD}$ or $V_{ref}$, in which case only the $\Phi_{XC}$ signal would be needed to perform common-mode removal. For CCCS (or current mirrors) a variety of circuit configurations are structures are available, two of which are shown in FIGS. 9D and 9E. While the configuration of FIG. 9D has fewer components, its current output may suffer from nonlinearity caused by transistor channel length modulation. The configuration of FIG. 9E provides a cascoded current mirror that is insensitive to voltage at the current output nodes. The choice of current source configuration involves a tradeoff between circuit complexity and accuracy.

An important concern in implementing current mirrors is matching, in this case between output currents A and B. To minimize matching errors, transistors with large values of width and length should be used and should be carefully laid out. For example the orientation of transistors should be the same for currents A and B.

Figure 10A:
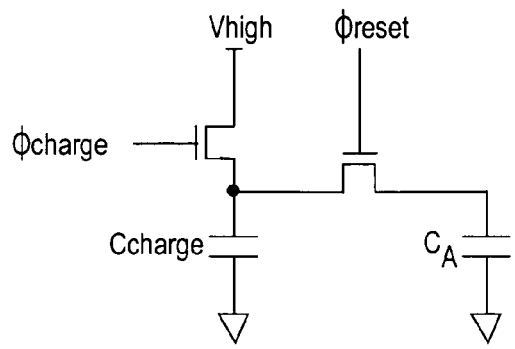
FIG. 10A depicts a configuration for resetting common mode using a shunt capacitor, useable with a resettable differential pixel detector according to an embodiment of U.S. Pat. No. 6,919,549.
Figure 10B:
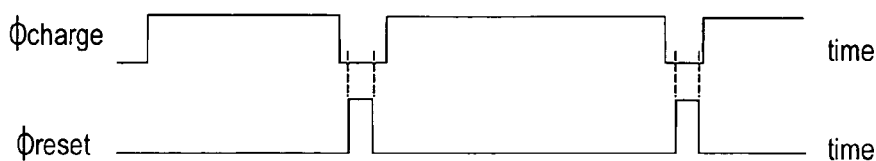
FIG. 10B depicts control waveforms found in the configuration of FIG. 10A, according to an embodiment of U.S. Pat. No. 6,919,549.

FIG. 10A depicts a shunt capacitor embodiment that periodically injects a certain amount of charge into photodetector $D_A$ and $D_B$ to compensate for the common mode. FIG. 10A depicts one-half of such a circuit, while FIG. 10B depicts control signal waveforms. A, preferably, very small capacitor $C_{charge}$ is initially charged-up to a relatively high voltage. When charge signal $\Phi_{charge}$ goes low and reset signal $\Phi_{reset}$ goes high, $C_{charge}$ and $C_A$ are connected, and most of the charge will be transferred to $C_A$ since its capacitance is much higher than $C_{charge}$. Since the same amount of charge is added into both halves of the configuration, the common mode signal is reset while the differential mode signal is preserved.

A description of the embodiments of parent application Ser. No. 11/110,982 will now be given with reference to FIGS. 11–13. In overview, new generations of CMOS sensors such as SmallCam, Pixim, can permit sensor operation at high dynamic range levels. For use in CMOS image sensing, ambient light is usually the parameter to be measured, and for which a high dynamic sensor range is needed. But for three-dimensional TOF sensing using a modulated optical energy source such as 120 in FIG. 1B, strong ambient light, a common mode signal, is detrimental. Unless the effects of ambient light are substantially reduced or eliminated, saturation of the different pixel photodetectors can result. In practice, TOF pixel photodetectors may have to operate within a large dynamic range of perhaps 100 dB.

As noted, the embodiments of FIGS. 3A–10B, taken from the '549 patent, disclose the use of common mode reset to reduce the effects of ambient light and dark current, both of which are common mode parameters. The challenge of course is to preserve all desired differential pixel detection signal values while resetting all common mode signal components to a fixed value. Preferably such results occur with little or no noise uncertainty from KT/C noise resulting from capacitors, save for parasitic capacitances.

Figure 11:
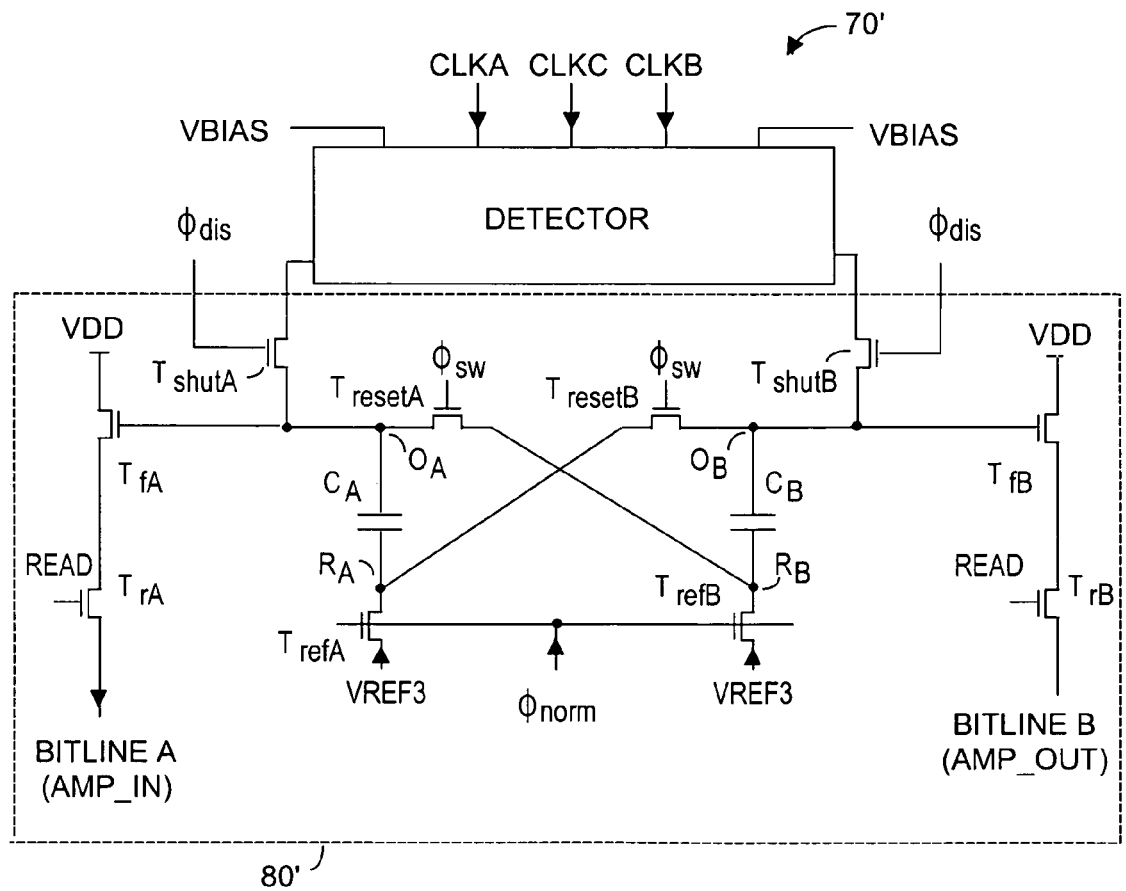
FIG. 11 depicts an embodiment of a differential common mode resettable sensor and associated switching transistors showing problem nodes, according to co-pending patent application Ser. No. 11/110,982.
Figure 12:
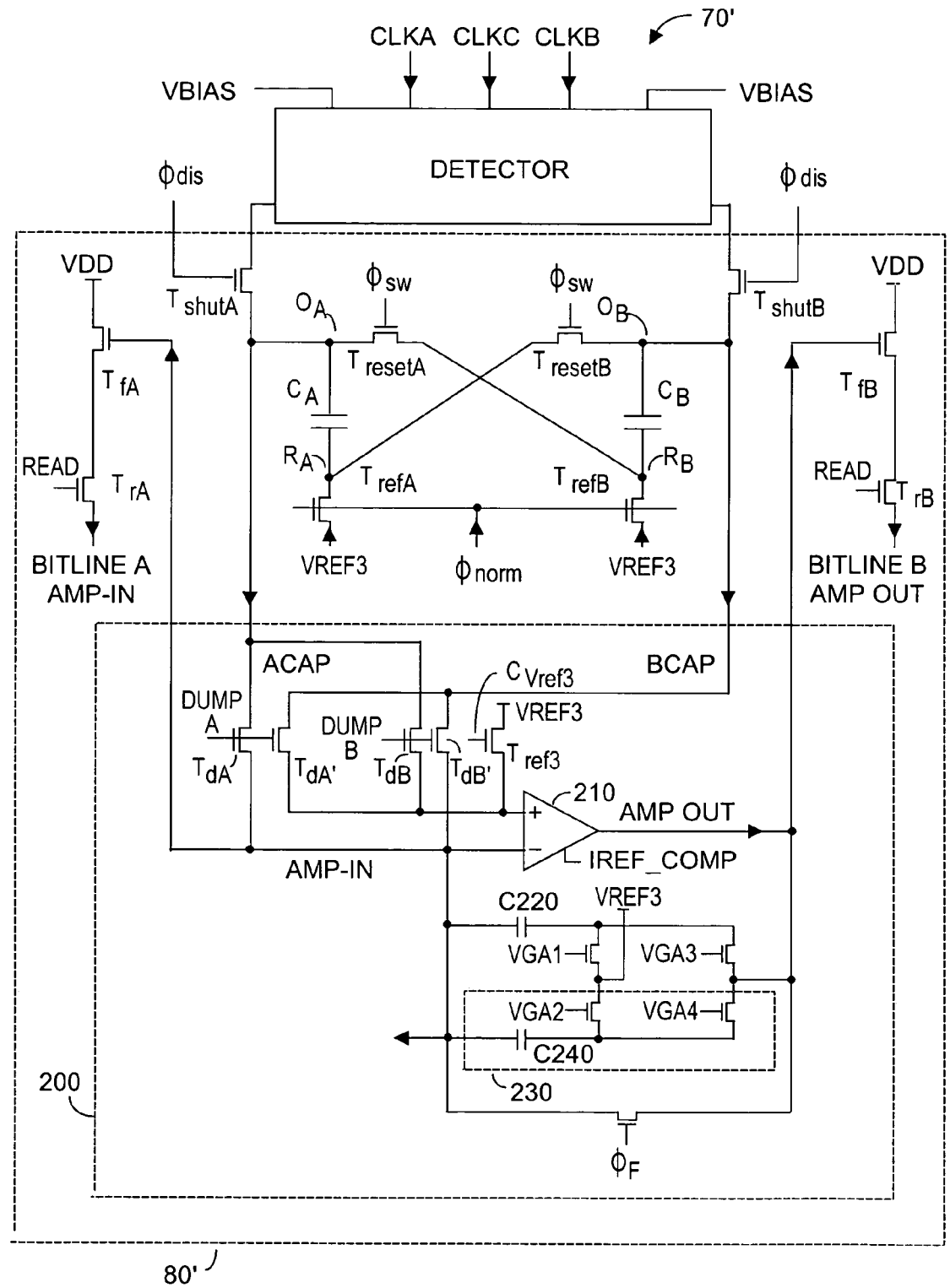
FIG. 12 depicts an embodiment of a differential common mode resettable sensor and associated switching transistors with enhanced performance, according to co-pending patent application Ser. No. 11/110,982.

In various aspects, embodiments of FIGS. 11–13 can improve upon the performance of embodiments described in the '549 patent, especially with regard to preserving more of the desired differential signal over each common mode reset. Referring now to FIG. 11, taken from application Ser. No. 11/110,982, a pixel differential photodetector 70' with common mode reset circuitry is shown. In FIG. 11 (as well as FIG. 12), components other than differential detector 70' may be collectively designated as dedicated per-pixel detector electronics 80', preferably implemented on IC chip 30'. Both halves of the full differential pixel detector are shown in FIG. 11, and it is understood that pixel detector 70' is preferably one of many detectors in an array 60', such as shown in FIG. 1B. The configurations of FIG. 11 and FIG. 12 may be operated with timing waveforms such as shown in FIG. 6B for common mode reset operations.

In FIG. 11, clock signals, e.g., CLKA, CLKB, CLKC, are generated from a clock driver system, preferably implemented on IC 30' (see FIG. 1B) and are coupled to detector 70'. It is understood that that other detector types using different clocking structures may be used. Further information as to clocking schemes may be found in U.S. Pat. No. 6,906,793 (2005) entitled Method and Devices for Charge Management for Three-Dimensional Sensing.

In FIG. 11, capacitors CA and CB are charge storage capacitors and typically are about 60 fF. Switch transistors TrefA, TrefB, responsive to a $\Phi_{norm}$ signal, couple a known reference potential Vref to capacitor bottom nodes $R_A$ and $R_B$. Reset transistors TresA, TresB, couple or de-couple nodes $R_A$ and $R_B$ to capacitor upper nodes $O_A$ and $O_B$, respectively. Reset signals $\Phi_{sw}$ selectively close resets transistors $T_{resetA}$ and $T_{resetB}$, which cause nodes $O_A$ and $R_B$ or nodes $O_B$ and $R_A$ to be connected to each other. Shutter transistors $T_{shutA}$ and $T_{shutB}$ are responsive to shutter signals $\Phi_{ds}$ that when active couple the respective "A" and "B" outputs from differential detector 70' to nodes $O_A$ and $O_B$. Transistors $T_{fA}$ and $T_{fB}$ are source followers that deliver the detector "A" or detector "B" portions of differential detector 70' signals to BITLINE A or BITLINE B via read transistors $T_{rA}$ and $T_{rB}$. (see FIG. 13).

Those skilled in the art will recognize that associated with nodes $O_A$, $O_B$, $R_A$, and $R_B$ will be parasitic capacitance, not shown in FIG. 11. One undesired effect of parasitic capacitance at these nodes is that instead of providing 100% of the differential detector signal to BITLINE A and BITLINE B, in practice only about 97% of the differential detector signal is preserved after each common mode reset operation. As a result, after multiple common mode resets, a relatively smaller fraction of the differential signal is available. For example, after about thirty common mode resets, only about 40% of the differential signal will remain. This results follows from $(0.97)^{30}$. Although the final signal/noise ratio is better than if only 40% of the incoming optical energy could be detected and collected, the 3% signal loss nonetheless degrades the overall signal/noise ratio. The parasitic capacitance of the detector results in elimination of only about 70% of the common mode signal (e.g., ambient light component).

This unremedied differential signal degradation results from undesired charge sharing between the integration capacitors CA and CB and the parasitic capacitance associated with detector 70'. What occurs is that when shutter transistors $T_{shutA}$, $T_{shutB}$ open during common mode reset, some charge is left in the detector capacitance and for this residual charge, common mode is not eliminated. This in turn requires more common mode reset cycles than would otherwise be necessary, which additional reset cycles result in further loss of the desired differential detector signal. Further the presence of residual common mode signal means that detector 70' operates at a lower magnitude voltage within its dynamic range than would otherwise be the case. The configuration of FIG. 11 will introduce KT/C noise but only for the parasitic capacitances on nodes $O_A$, $O_B$, $R_A$, $R_B$. However since the parasitic capacitances are small (perhaps on the order of 1 fF), the KT/C noise is small and is generally less than the shot noise of the detector.

FIG. 12 presents an embodiment using additional common mode reset circuitry 200, that improves differential loss over the embodiment of FIG. 11, while enjoying the same relatively low KT/C noise characteristics. Within circuitry 200, operational amplifier 210 functions to remove differential detector signal charge from nodes $O_A$, $O_B$ and to store the removed charge in an integration capacitor. With this functionality, the embodiment of FIG. 12 preserves the stored removed charge without substantial loss due to subsequent common mode reset cycles.

In practice, at least a substantial fraction (e.g., $\geq 50\%$) of the stored charge is removed for isolated storage on each so-called dump cycle. It will be appreciated that the system could function with less than 50% stored charge removal per cycle, however overall more differential charge will be lost during common mode reset operations. The result from saving at least a substantial fraction of the differential charge is improved dynamic range, improved retention of the desired differential detector signal, and improved common mode rejection. Components shown in FIG. 12 other than differential detector 70' may be designated as electronics 80', preferably dedicated to each pixel detector 70, and CMOS-implemented on the common IC 30'.

During an integration period T, operation of the embodiment exemplified by FIG. 12 involves a number n of common mode reset operations, and a number x of dumps (transfers-out) of the differential charge from capacitors $C_A$, $C_B$ associated with each differential pixel detector into an active integration capacitor C220. Once dumped, the differential charge is stored in capacitor C220 and is not affected by subsequent common mode resets. More than one integration capacitor may be used, and within an integration period T, the number of dumps x may be less than or equal to or even greater than n. However in a preferred mode of operation, there will be a dump or transfer-out of differential charge before a common mode reset.

During common mode reset operation, the differential detector signal charge is first read transferred into the integration capacitor C229 by turning-on dump transistors $T_{dA}$, $T_{dA'}$. So doing dumps charge from capacitor $C_A$ node $O_A$ and from capacitor $C_B$ node $O_B$ respectively into the non-inverting and inverting inputs of operational amplifier 210. Shutter transistors $T_{shutA}$ and $T_{shutB}$ remain open, which allows even the differential detector charge to be transferred. Subsequent common mode resets will have no effect on this safely stored-away differential detector and capacitor $C_A$ and $C_B$ charge. Next, shutter transistors $T_{shutA}$ and $T_{shutB}$ and dump transistors $T_{dA}$, $T_{dA'}$ are opened, and common mode reset is performed.

Whereas the embodiment of FIG. 11 preserved perhaps 97% of the pixel differential photodetector signal charge, the embodiment of FIG. 12 can retain as much as 99.5% of this charge, a substantial improvement. Furthermore, the 0.5% or so charge loss that occurs will be substantially independent of the number n of common mode rejection cycles. The KT/C noise characteristics and removal of common mode by common mode reset for the embodiment of FIG. 12 will be similar to that of the configuration of FIG. 11.

Amplifier 210 provides a single-ended output signal (AMP OUT) that could be used to directly drive a bitline (BITLINE B) without use of a source follower such as $T_{fB}$ in FIG. 12. Nonlinear effects of the source follower for bitline A are small because the voltage magnitude will be close to Vref3. Also depending upon how bitline readout is implemented, BITLINE A may be coupled directly to Vref3 instead of via a source follower for reasons of simplicity. Inclusion of a source follower introduces nonlinear effects, especially in the presence of a large differential signal when source followers $T_{fA}$ and $T_{fB}$ would be operating at different gate input voltages. However in practice, considerations of operational amplifier size, operating power and stability may dictate the inclusion of source followers, as shown in FIG. 12.

Referring to FIG. 12, components in sub-system 230 are optional. However these components allow closed-loop gain of operational amplifier 210 to be varied by adding C240 to increase effective integration capacitance. Integration capacitance can be increased by judiciously enabling transistor switches in the feedback loop via control signals VGA1, VGA2, VGA3 and VGA4. This flexibility can advantageously vary amplifier 210 closed loop gain, and can be used to improve distance measurement resolution δZ, while still avoiding amplifier saturation.

At the end of an integration period, the total accumulated charge in integration capacitor 220 (perhaps 40 fF) may be read-out in several ways. When the READ signal to the gate of transistor $T_{rA}$ is high (for the configuration shown), the signal present at the inverting input of operational amplifier 210 will be read-out to BITLINE A. Preferably simultaneously, the READ signal also turns-on transistor $T_{rB}$ such that BITLINE B reads-out the AMP OUT signal. What results is a differential signal across BITLINE A and BITLINE B that represents the correct voltage value stored on integration capacitor C220.

An alternate read-out method will now be described. Consider now the signal at the non-inverting input of operational amplifier 210. A high signal $C_{Vref3}$ turns-on transistor $T_{ref3}$, which couples a known reference voltage $V_{REF3}$ to the non-inverting input of operational amplifier 210. As a result, a high READ signal to transistor $T_{rB}$ reads-out the signal on BITLINE B. If necessary, BITLINE A may be read-out simultaneously to reduce the effects of noise on $V_{REF3}$. The result is achieved by creating a differential value at the input of operational amplifier 210, wherein one of the differential values is $V_{REF3}$.

It will be appreciated that some mismatch may exist between the values of storage capacitors $C_A$, $C_B$ as well as between node parasitic capacitance, which mismatches can affect the final signal value of the first-described read-out method. It is understood that there will be parasitic capacitance at the non-inverting input of operational amplifier 210. Relative to a capacitor reset value of Vref, the AMP. The charge (with respect to a capacitor reset value of Vref) on this parasitic capacitance is substantially eliminated when the node is coupled to $V_{ref3}$. This is what occurs in the second read-out method, but unfortunately a charge error is created whenever the initial amplifier input was not precisely $V_{ref3}$. However effects of mismatch using the first read-out method and effects of charge error using the second read-out method can both be reduced by first bringing the voltage levels at both operational amplifier 210 inputs substantially to the initial reset value. The desired result can be accomplished by performing a series of common mode reset and charge dump operations before beginning the read-out sequence.

Alternately by reading from Bitline A a single ended value (denoted SBA), the error resulting from mismatch between Vref and voltages on the inputs to operational amplifier 210 can be compensated for mathematically. This is because for both read-out methods, there is a mathematical formula between the error and SBA. This mathematical formula is a function of SBA and integration capacitor C220, and either the capacitance mismatches (for the first read-out method) or the non-inverting operational amplifier positive terminal capacitance (for the second read-out method). Note that for the second read-out method the value SBA must be read-out before $V_{ref3}$ is connected.

A combination of both read-out methods can be used, as follows. First the voltage on the two operational amplifier inputs is brought close to the reset voltage $V_{ref3}$. Then SBA is read-out using either read-out method, and the remaining error is mathematically calibrated out. For economy of implementation, it is preferable to acquire SBA with relatively low accuracy. Thus in practice, SBA is read-out before the voltage on the operational amplifier inputs is brought close to reference voltage $V_{ref3}$ via repeated common mode reset dump operations.

Before this series of common mode reset dump operations, magnitude of SBA relative to the reset voltage $V_{ref3}$ will be fairly large, perhaps in the tens or hundreds of mV range. But after the series of common mode reset dump operations, this residual SBA voltage will be on the order of perhaps a few mV. Furthermore, this residual voltage will be a known fraction of the original SBA voltage before the series of common mode dump operations. Because this fraction is known a priori, by quantizing the larger quantity (magnitude of SBA before the reset operations), the smaller quantity (magnitude of SBA after the reset operations) can be known more accurately. The fraction can be determined empirically, or can be modeled taking into account relative values of $C_A$, $C_B$, and parasitic capacitance present at the non-inverting input of operational amplifier 210.

The addition of transistor switches connected to the DUMP B signal allows the differential detector system shown in FIG. 12 to function symmetrically with respect to "A" and "B" detector components. As a result, at some times the "A" and "B" components of differential detector 70' will be coupled to the non-inverting input and inverting inputs, respectively, of operational amplifier 210, and at other times the capacitor couplings will be reversed. Within an integration period T, there may be several integration time slices defined. After each sub-integration time slice, one might decide to carry out a dump operation, a common mode reset operation or both. After each integration time slice, the roles of "A" and "B" within the differential detector 70' may be alternated. This alternation can result from interchanging the clock signals for "A" and for "B", or changing by 1800 the phase of optical energy emitted by 120 (see FIG. 1B), which has the same effect. With such alteration, a differential signals is produced at the output of detector 70' that, to the first order, is the inverse of the differential signal at the previous sub-integration time slice.

Note that the DUMP B-related transistor switches couple operational amplifier 210 with the non-inverting and inverting input terminals switched with respect to DUMP A. As a result, the signal that accumulates on integration capacitor C229 accumulates in additive fashion. This feature advantageously substantially reduces many errors associated with offsets and the like. Advantageously, this aspect reduces reliance upon 0°, 180° cancellation in different detection signal captures. This improvement follows because both 0° and 180° phases are used within a common capture (e.g., at a close time interval perhaps on the order of a mS or so) to cancel errors.

Note too that additional functionality results from the presence of operational amplifier 210. For example, this amplifier may be used for two purposes: to enhance common mode reset as noted above, and for pixel detector analog-to-digital conversation using techniques well known in the art. Other secondary uses of the operational amplifier can include dynamic range enhancement, 0°, 180° cancellation, 0°, 90° capture, and so on.

Some exemplary parameters for the embodiment of FIG. 12 not stated above will now be given. Capacitor C240 is nominally about half the value of integration capacitor 240, e.g., about 20 fF, where storage capacitors $C_A$ and $C_B$ are each about 60 fF. Exemplary fabrication data for transistors $T_{fA}$, $T_{fB}$ are about 0.5µ/0.356µ, transistors $T_{rA}$, $T_{rB}$ are about 1.5µ/0.6µ, transistors $T_{refA}$, $T_{refB}$, $T_{resetA}$, $T_{resetB}$ are about 0.42µ/0.6µ, transistors $T_{shutA}$, $T_{shutB}$ are about 0.42µ/0.6µ, and the four transistors associated with capacitors C220, C240 are each about 2µ/0.6µ.

FIG. 13 depicts various oscilloscope amplitude versus time traces for AMP IN, AMP OUT and DUMP A waveforms for a received detector light phase such that the AMP OUT signal increases with time. The integration period T in FIG. 13 is approximately 18 ms. The uppermost waveform is the AMP A or BITLINE B signal, which represents the accumulated differential between charge on capacitor $C_A$ and capacitor $C_B$ during the integration time T. It is seen that the AMP OUT signal approximates a stair-step waveform that increases every time DUMP A is turned on. The resetting of AMP IN and AMP OUT to the reference voltage preceding each reset occurring at events $\phi_F$, is shown superimposed on the DUMP A reset signals. It is understood that when $\phi_F$ is active, high in this example, active reset signals are also present at $\phi_{SW}$, $\phi_{norm}$, and so forth. In FIG. 13, waveforms just preceding events $\phi_F$ are read actions, for which the non-inverting operational amplifier input is coupled to Vref3. For ease of illustration, magnitude of Vref3 is intentionally shown as being different than magnitude of the reset voltage.

To recap before describing the present invention, embodiments of FIGS. 3A–10B provided pixel differential photodetectors with enhanced common mode rejection characteristics, using various common mode reset methods and configurations to electronically reduce the maleffects of ambient light. The embodiments of FIG. 11 and FIG. 12 provided substantial improvement in retention of the desired differential charge in pixel differential photodetectors. But in some applications, large magnitudes of the desired differential detection signal may saturate the pixel differential photodetectors. An additional challenge is how to enhance signal/noise ratio for a TOF system employing pixel differential photodetectors, preferably while using all of the detectable incoming optical energy, SO as to preserve system depth resolution. Embodiments of the present invention that addresses these issues using relatively little additional circuitry will now be described with reference to FIG. 14–FIG. 17C. Indeed, embodiments of the present invention may be implemented within the perhaps 50 µm×50 µm area of a pixel.

FIG. 14 depicts an embodiment of a differential pixel or pixel electronics 80''' with improved differential dynamic range and signal/noise ratio, according to embodiments of the present invention. Portions of differential pixel 80''' are similar to what has been earlier described. For example, in addition to implementing the present invention, differential pixel 80''' also provides common mode reset with restoration of common mode potential at the input of operational amplifier 210. Elements in FIG. 14 bearing element numbers similar to element numbers used elsewhere herein may be understood to refer to elements that are similar to the earlier described elements. Thus detectors 70' preferably is a differential photodetector, perhaps such as described with reference to FIGS. 3C–12. Elements of pixel electronics 80'' may also be similar to elements within electronics 80', as described earlier herein. For example components within block 200' in some respects may be similar to components within block 200 in FIG. 12, although components within pixel electronics 80'' can advantageously serve several functions. Detector 70' in shown in FIG. 14 as receiving a number of VBIAS and clock signals, but it should be understood that more or fewer such bias and clock signals can instead be used. If desired, additional description regarding differential photodetectors may be found in U.S. Pat. No. 6,906,793 (2005) Methods and Devices for Charge Management for Three-Dimensional Sensing, assigned to Canesta, Inc.

Figure 15A:
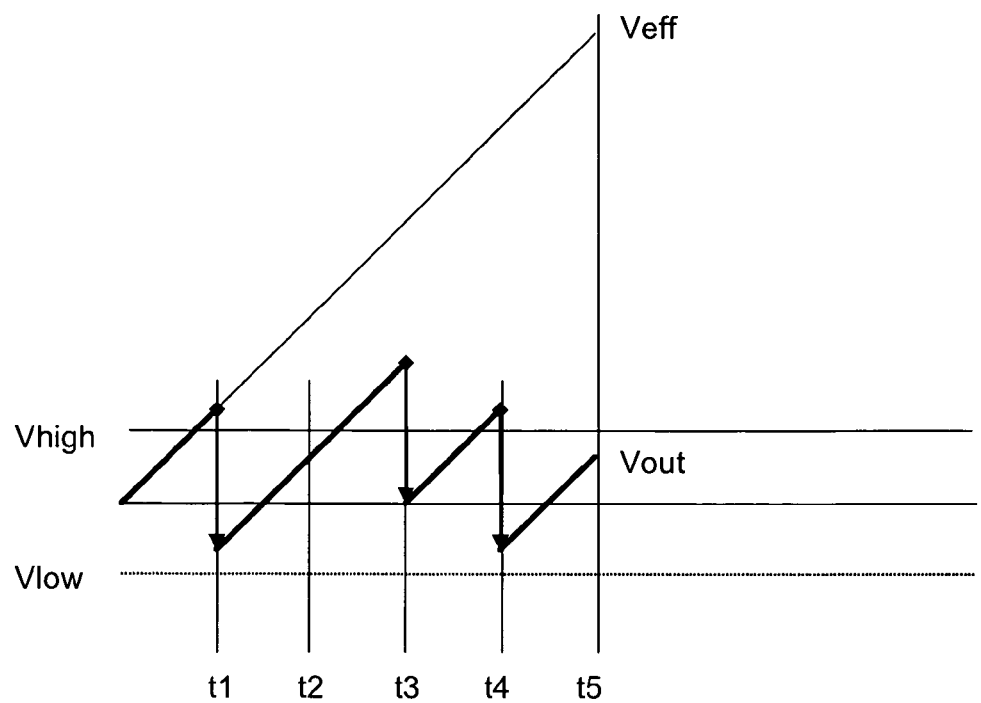
FIG. 15A depicts exemplary waveforms showing synchronous differential signal capacitor resetting to enhance large differential dynamic gain, according to an embodiment of the present invention.

As noted, one aspect of the present invention further improves differential pixels, especially with respect to avoiding saturating even with relatively large amplitude differential signals, while another aspect of the present invention enhances signal/noise ratio for the detection signal path. In this first aspect, embodiments of the present invention add a fixed compensating offset (ΔV) to the differential signal voltage on capacitor $C_{DSC}$ whenever magnitude of the differential signal exceeds a predetermined maximum or minimum value. (If desired, the fixed compensating offset signal could of course be ΔQ, where Q is charge.) With reference to FIG. 14, within electronics 80'', circuitry 300 is used to implement the insertion, as required, of the fixed compensating offset ($\Delta V$) into differential signal capacitor $C_{DSC}$ to avoid differential pixel saturation, even from relatively large amplitude differential signals. As such, offset $\Delta V$ is negative if the voltage on $C_{DSC}$ has become too positive, and the offset $\Delta V$ is positive if the voltage on $C_{DSC}$ has become too negative. In some embodiments, for example as shown in FIG. 15A, the accumulated charge voltage on the differential signal capacitor is checked synchronously, at which time $\Delta V$ is added, if needed. A count is kept of the number (N) of $\Delta V$ offsets that had to be added, and effective differential signal capacitor voltage is actual output voltage across the capacitor (Vo)+N·$\Delta V$. In other embodiments, as exemplified by FIG. 15B, reset of the integration capacitor voltage is asynchronous, and occurs whenever the voltage exceeds a predetermined maximum or minimum threshold. Again a count of the number (N) of resets is kept, and effective differential signal capacitor voltage is Vo+N·$\Delta V$. These embodiments preserve the desired differential signal and prevent saturation of the differential pixel even when the differential signal is large in amplitude. Saturation due to common mode signal is prevented, preferably using embodiments of the above-referenced co-pending application Ser. No. 11/110,982.

Further, within electronics 80''', a second aspect of the present invention is implemented using a portion of circuitry 200' to dynamically vary the gain $A_G$ of pixel amplifier 270 to enhance detection signal/noise ratio by using a highest possible gain that still avoids saturation of pixel electronics 80'''. A high amplifier gain ($A_G$) advantageously reduces effective noise contribution downstream in the signal path by 1/$A_G$. Gain of each such amplifier is variably controlled to adjust $A_G$ individually for each pixel as a function of its present signal value. Within the array of differential pixels, each amplifier is first operated at maximum $A_G$, and integration capacitor values are readout and stored in a row buffer 65 (see FIG. 17A). $A_G$ for each amplifier in the row is then incrementally decreased, and the row buffer is updated only for those amplifiers whose associated integration capacitor is not presently saturated. The above process is repeated until the value in the row buffer corresponds to the highest non-saturating gain for each amplifier associated with the row. The row buffer also records the value of the highest non-saturating gain for each amplifier associated with the row. At this juncture row buffer 65 is readout, and the process is repeated for the next row in the array, and so on continuously. In this fashion amplifier values of $A_G$ are individually maximized, commensurate with avoiding overload or saturation of components downstream in the signal path. The desired result is enhanced signal/noise ratio. Alternative embodiments can, of course, increment rather than decrement amplifier gain, and cause the row buffer to latch the non-saturated gain value for each amplifier associated with a row.

Further details as to the increment/decrement $\Delta V$ aspect of the present invention to avoid pixel saturation due to large magnitudes of differential signal will now be given with reference to FIGS. 14, 15A, 15B, and 16. Referring to FIG. 15A, in accommodating for large differential dynamic range, for ease of explanation let the differential charge first be converted to a single ended value and be collected in a differential signal capacitor $C_{DSC}$ (see FIG. 14, circuit block 230'). It is understood that the relationship between the detected differential photocurrent i, the capacitor $C_{DSC}$, and the resultant voltage is given by $i = C_{DSC} \delta V/\delta t$.

As shown in FIG. 15A, at periodic intervals, e.g., at t1, t2, t3, . . . , magnitude of the charge voltage developed on capacitor CDSC is checked synchronously. If at the moment of check the voltage on $C_{DSC}$ exceeds a threshold, $V_{high}$ or $V_{low}$, then a compensating fixed amount of charge (denoted $\Delta V$) is added to capacitor $C_{DSC}$ as a compensating offset. Thus if the accumulated voltage on $C_{DSC}$ becomes too positive, e.g., V>$V_{high}$, then an offset of $-\Delta V$ is added to capacitor $C_{DSC}$, and if V becomes to negative, V<$V_{low}$, then an offset of $+\Delta V$ is added to capacitor $C_{DSC}$.

For example, in FIG. 15A at time t1, V>$V_{high}$ and a negative offset $\Delta V$ is added to the capacitor voltage. At time t2, magnitude of the capacitor voltage does not exceed $V_{high}$ or $V_{low}$ and no offset is added. However at time t3, the voltage is again too high and a negative offset $\Delta V$ is again introduced, and so on. The number (N) of resets is counted and at a given time, the effective voltage ($V_{effective}$), had no resetting occurred, is equal to $V_{out}$+n$\Delta V$. For the example of FIG. 15A, there were three resets (n=3), the $V_{effective}=V_{out}+$N$\Delta V$,=Vout+3$\Delta V$. A diagram similar to FIG. 15A can of course be drawn for capacitor $C_{DSC}$ acquiring a negative charge, in which case a positive offset $+\Delta V$ would be added whenever the capacitor voltage goes below $V_{low}$. If the effective capacitor saturation voltage is very high, an offset larger than $V_{high}$ but preferably not larger than ($V_{high}-V_{low}$) may be used to reduce the number of offsets N.

Figure 15B:
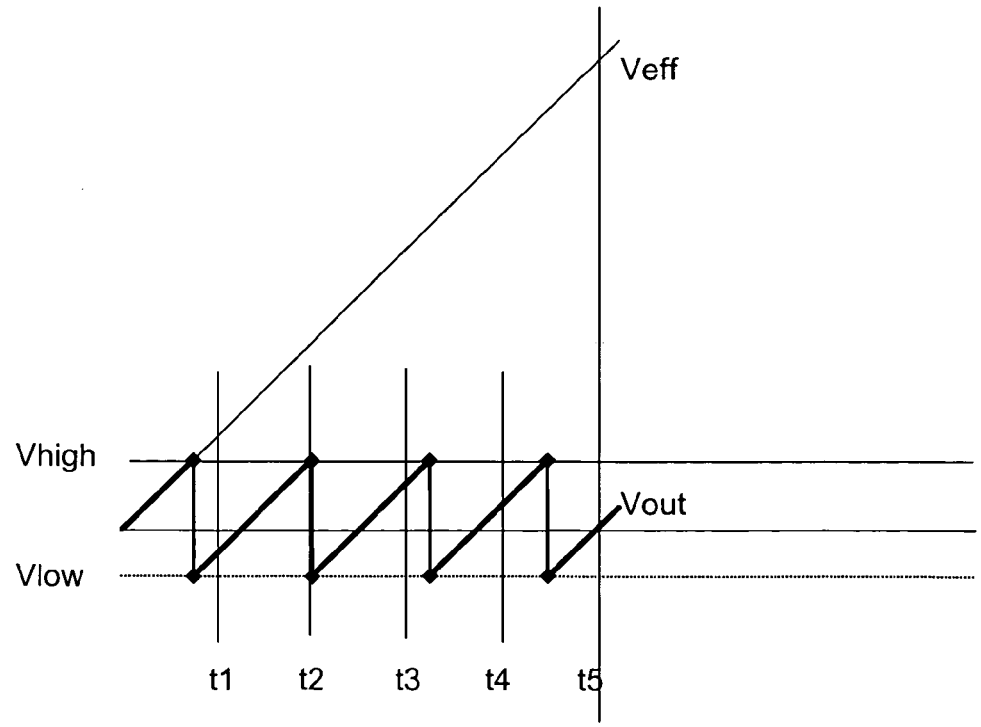
FIG. 15B depicts exemplary waveforms showing asynchronous differential signal capacitor resetting to enhance large differential dynamic gain, according to an alternative embodiment of the present invention.

FIG. 15B depicts an alternative embodiment, again using the example of a capacitor $C_{DSC}$ acquiring a positive charge, in which the voltage on $C_{DSC}$ is reset asynchronously, whenever V>$V_{high}$. In this example, each reset adds $-\Delta V$ to the capacitor voltage, which returns the capacitor voltage to $V_{low}$. Again the number N of resets is counted, and the effective capacitor voltage is given by $V_{effective}=V_{out}$+N$\Delta V$, or since n=4 in this example, $V_{effective}=V_{out}$+4$\Delta V$. If the effective capacitor saturation voltage is very high, a negative reset offset, preferably not lower than $V_{low}$ (the low saturation voltage) may be used to reduce the number of resets N. Again a similar diagram may be drawn for the case of a capacitor $C_{DSC}$ accumulating a negative voltage.

The choice of implementing synchronous or asynchronous reset depends upon many factors. Generally, an asynchronous reset is more complex as each pixel must constantly monitor its differential signal capacitor voltage, and self generate control signals required to adjust the $C_{DSC}$ voltage. Further, these operations must be performed accurately in the presence of noise, as the other pixels are integrating and hence the modulation clocks are running. Further, if the reset count is not accumulated inside the pixel, the occurrence of resets may need to be communicated asynchronously, a difficult task when all pixels simultaneously reset.

On the other hand a synchronous implementation requires more frequent resets as the pixels must be reset well before they saturate. Further, it must be ensured that the pixels have sufficient remaining margin such that they do not saturate before the next $C_{DSC}$ voltage check, which may not occur for a while. Also in synchronous implementations, each $\Delta V$ reset adjustment must be smaller as the $C_{DSC}$ voltage may be relatively far from saturation.

FIG. 16 depicts exemplary pseudocode used to an embodiment of the first aspect of the present invention, the $\Delta V$ potential to compensate for large differential signal magnitudes. More specifically, the pseudocode of FIG. 16 provides detail as to implementing the synchronous reset embodiment of FIG. 15A, using circuitry shown in FIG. 14. Separate pseudocode to implement an asynchronous embodiment such as shown in FIG. 15B is not given in that implementation steps will be self-evident to those skilled in the relevant art in view of the description given with respect to FIG. 16. The exemplary algorithm of FIG. 16 may be stored as software 350 in memory 100 of a TOF system 400, for execution by microprocessor 90 (see FIG. 17A). At the circuit level, execution of this algorithm preferably implements the following method steps.

(1) relevant circuitry in FIG. 14 is reset by simultaneously turning on resetF (sometimes denoted $\phi_F$), reseta, resetB, refcon_int, shutterA, shutterB, dumpA, dumpB;

(2) resetF, reseta, resetB (and perhaps DumpA dumpB) are opened, modulation clocks CLKA, CLKB, CLKC are turned on, and integration begins. For the configuration shown, refcon_int and reset) must be high during integration. The high state can be forced by setting offset_control=0, HILO=1, which forces Y=0, whereby if refcon_bar =0 (e.g., complement of refcon, denoted REFCON in FIG. 14), refcon_int =1;

(3) modulation clocks are turned off;

(4) dump switches DumpA are closed and the differential charge is moved to capacitor $C_{DSC}$, whose value is on the order of perhaps 40 fF. Dump switches are then reopened;

(5) shutter switches ShutterA ShutterB are open circuit, and then ResetAB switches are closed to restore common mode at the input of operational amplifier 270, as described earlier herein;

(6) a test is performed on voltage $V_x$ across differential signal capacitor $C_{DSC}$ to see whether the voltage is becoming too large, perhaps >500 mv. Assume the logic trip point of the threshold test gate 320 is 2V. $V_x$ test is achieved by turning on VGA1 (and/or VGA2), turning off VGA3 (and/or VGA4), and setting $V_{ref3}$ to 2.5 V. (This statement ignores, for the sake of simplicity, effects of capacitance at the (AMP_IN) inverting input of amplifier 270.) If the input of the threshold test Gate T is then $V_{test}$<500 mv then $V_x$>500 mv. During this test offset_control=1. Thus the output of gate 320 is high if and only if $V_x$>500 mv.

(7) if $V_x$>500 mv, a fixed charge $\Delta V$ is dumped into capacitor $C_{DSC}$ to reduce $V_x$ and avoid the saturation that would occur if $V_x$ increased further. The decision is available at node Y: HILO=1 if the test was for $V_x$ high, and HILO=0 if the test was for $V_x$ being low. In this exemplary case, HILO=1 and Y=0 if and only if Vx>500 mv.

(8) during this time, reference levels ($V_{ref1}$-$V_{ref2}$) are set such that [C]·$\Delta V$ is approximately [$C_{DSC}$ in parallel with $C'_{DSC}$]·($V_{ref1}$-$V_{ref2}$), where $C'_{DSC}$ is about 20 fF and, as noted, $C_{DSC}$ is about 40 fF. The resultant charge [60 fF]·($V_{ref1}$-$V_{ref2}$) is potentially dumped into integration capacitor C When recon_bar=0, recon_int=1, if and only if $V_x$>500 mv. If recon_int is high, then a differential charge 40FF*($V_{ref1}$-$V_{ref2}$) is created between the two capacitors. In this case an exemplary value for ($V_{ref1}$-$V_{ref2}$) is perhaps –900 mv. If desired, a single capacitor $C_{DSC}$ may be used in this embodiment, or if more capacitors are present, a single capacitor may be used, if desired.

(9) Steps similar to (6), (7), (8) are repeated for testing if the voltage across capacitor X is too low (e.g. $V_x$<–500 mv). Note that during this operation an exemplary value for $V_{ref1}$-$V_{ref2}$ is perhaps +900 mv

(10) At this juncture the differential voltage in the capacitors is preferably 0 if no offset occurred, –900 mv if a negative offset occurred, and +900 mv if a positive offset occurred. At a time, e.g., when refcon_bar=1, this corresponding differential charge may be dumped onto differential signal capacitor $C_{DSC}$ by turning off refcon_bar and turning on dump switches dumpA and dumpB;

(11) A count of the number of times a charge of either polarity of 60FF·($V_{ref1}$-$V_{ref2}$) is dumped onto this capacitor is maintained. The total amount of differential charge generated by the detectors is then N·Q+$V_x$ where $Q_x$ is the final charge in the capacitor and N is the number of times the offset dump occurred.

Various methods for maintaining this offset count N may be implemented. The count N may be stored within the pixel to be subsequently read-out, or can be read-out from each pixel following each offset test operation. If the positive or negative sign of the offset $\Delta V$ (or if charge is used, $\Delta Q$) is known, then only the magnitude of the count need be stored. Alternately positive numbers can be used for positive offsets, and negative numbers can be used for negative offsets.

A simple solution is of course to implement an up/down analog or digital counter within the pixel, e.g., electronics 80'''. The count should increment if the hi test is successfully performed (i.e. recon_int=1) and the count should decrement if the low test is successfully performed (i.e. recon_int=1).

A digital counter may be implemented in many ways, including without limitation providing a pseudo random sequence type counter. An analog counter may be also be implemented in many ways. For example, a short pulsed current source could be used to charge or discharge a capacitor with each change in N, where final capacitor voltage is indicative of how many charging/discharging pulses have been received. Alternately an analog counter may be implemented by dumping charge from a second capacitor onto a first capacitor, where dumped charge is positive or negative, depending upon whether the count was up or down. In such implementation, the final charge on the first capacitor would be indicative of the number of times the dump occurred, and whether the dump was up or down. Note that depending on the details of a particular counter implementation, a linear correspondence between the count N and the final analog voltage need not exist.

Rather than count offsets within the pixel, one may instead count outside the pixel, for example, by inferring the reset count N. In such an implementation, the preferably differential pixel value is read-out at the end of the first integration period, or after the first few integration periods. The resultant low resolution value provides an estimate of the final value of the pixel. In essence it provides an interval of possible values [$V_{final}^{low}$, $V_{final}^{high}$]. For example, if there are M integration intervals and the pixel reading after the first integration period is $V_1$ with a margin of error $\epsilon$, then the interval of possible final values could be [$V_{final}^{low}$, $V_{final}^{high}$]=[M*($V_1$-$\epsilon$), M*($V_1$+$\epsilon$)]. The final value for the pixel is $V_{effective}$=N·[$V_{offset}$+$V_{out}$]. N must be selected such that $V_{effective} \in [V_{final}^{low}, V_{final}^{high}]$. If ($V_{final}^{high}$-$V_{final}^{low}$)<$V_{offset}$ then N is unique and can be readily determined.

Figure 17A:
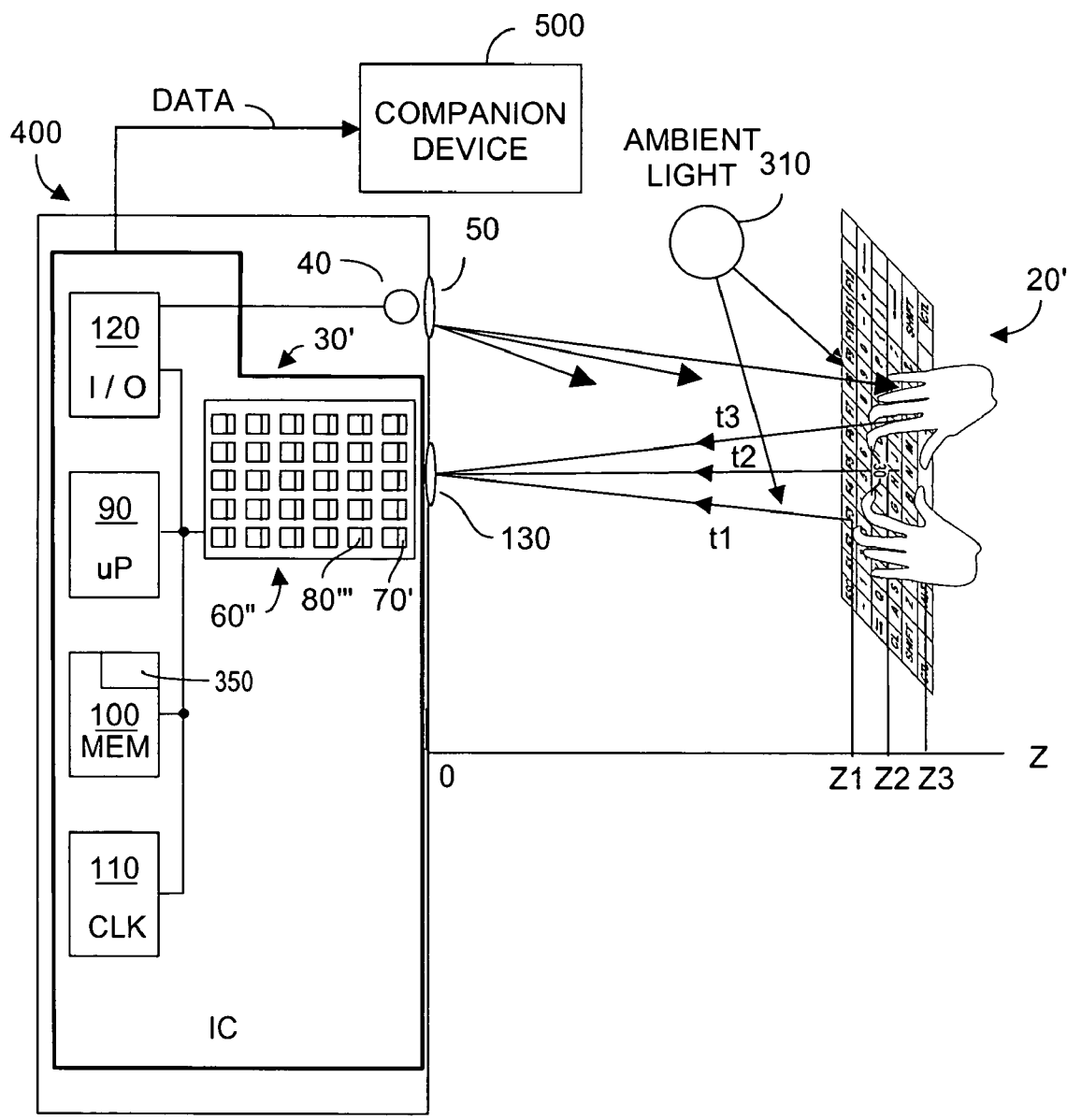
FIG. 17A depicts a TOF system including differential pixels according to the present invention, used to implement a virtual input device.

Alternately the count N (number of times each pixel was offset) can be maintained outside the pixel array 60'' (see FIG. 17A). At the end of each hi or low offset test, each pixel can output a 1 if the test was positive or 0 otherwise. The pixel array is quickly scanned and for each pixel whose output was 1 the corresponding count is incremented or decremented depending upon whether the test was for a high value or low value. In a preferred embodiment, at the end of both hi and low tests, a single value is produced that preferably can take on one of three meanings up-count, down-count, and no-count. Such embodiment is advantageous in that these values can be read from the array during the next integration period, e.g., a time that lasts for at least several 100 us. By contrast the high and low test may occur a few microseconds apart and thus, but for this aspect of the present invention, it can be difficult to read the entire array in such a short period.

Referring to block 310 at the bottom of FIG. 14, a compact tri-state circuit to accomplish the above is shown. This simple two transistor circuit outputs one of three values to indicate to the outside world whether the associated pixel detection signal required +Δ offset, −Δ offset, or no compensating offset at all. In a preferred embodiment, the output is first pre-charged at a value $V_{ref}$ between ground and $V_{DD}-V_t$. If a low (−Δ) offset occurs then Refcon_int=1 with Offset_control=1 and HiLO=0 will be sampled onto the output out. Similarly if a high offset (+Δ) occurs then Refcon_int=1 with Offset_control=1 and HiLO=1 will be sampled as $V_{dd}=V_t$ onto the output out. Thus, the output of this simple tri-state device is $V_{ref}$ if no offset occurred, is 0 if −Δ occurred, and is $V_{DD}-V_t$ if +ΔV (high offset) occurred. Given that there are many hundreds of pixels within a pixel array, e.g., array 60" in system 400 in FIG. 17A, it is required that relatively little area of IC 30' be required to implement each tri-state device 310. The dynamic pass-through use of transistors to implement tri-state device 310 is preferred to an implementation using standard logic. A standard logic implementation would simply require too much area of IC 30' (see FIG. 17A) to be practical, given that many hundreds of such tri-state devices must be implemented.

As noted earlier, a second aspect of the present invention provides enhancement of signal/noise in the pixel detection path, by maximizing gain $A_G$ of each amplifier 270 (see FIG. 14). During readout from a signal path, amplification (or gain) can reduce downstream noise by a factor of $1/A_G$. Thus, embodiments of the present invention implement amplifier 270 as a variable gain amplifier (VGA).

Looking at TOF system 400 in FIG. 17A, the value of a pixel detector 70' is read though an analog and digital signal path. To reduce effective noise (including analog-to-digital quantization noise) it is beneficial to keep the gain as high as possible as early as possible in the signal path. If desired, multiple variable gain amplifiers could be provided in the signal path, each amplifier maximizing the signal strength on segments of the path downstream. Understandably additional information corresponding to the $A_G$ gain settings for each such VGA amplifier needs to be known to decode the output signal value of the signal path.

However, setting the VGA gain too high can cause saturation in the signal path downstream of the amplifier, and setting the VGA gain too low exposes the system to more effective noise downstream of the amplifier. VGA. The optimal setting for VGAs in a signal path depends on the present signal value and also the noise characteristics of the path. Hence, setting VGA gains beforehand (a priori) may result in a sub-optimal setting. However, if the VGA gain settings are set after the signal is known (a postiori) a more optimal setting can be determined and used.

In a preferred embodiment, a VGA such as amplifier 270 in FIG. 14 is incorporated into each pixel 80''' in sensor array 60". The VGA gain $A_G$ is set individually for each pixel based on the present differential signal value at that pixel. According to the present invention, the VGA preferably is shared with other functionality in the pixel, for example, implementing improved CMR and/or high active dynamic range, as described earlier herein. A preferred implementation is shown in FIG. 14, in which there are two VGA feedback capacitors, $C_{DSC}$ and $C'_{DSC}$, which capacitors advantageously also enhance detection ability despite the presence of large magnitude differential signals, as described earlier herein. The use of these two VGA capacitors enables three possible feedback capacitance values (discounting a null capacitor case).

In normal operation of system 400 (see FIG. 17A, part of which system is shown in FIG. 14), i.e., during integration, CMR, etc. the two VGA capacitors are coupled in parallel with an effective value of 60 fF, where an exemplary value for $C_{DSC}$ is 40 fF, and an exemplary value for $C'_{DSC}$ is 20 fF. Signal charge is stored in both capacitors, as they are parallel-coupled, but during readout, the gain of VGA 270 may be changed.

The feedback around amplifier 270 may be tuned. For example by using the following transistor gate signals VGA3=0, VGA1=1, VGA2=0, VGA4=1, charge from $C'_{DSC}$ is dumped into the larger value capacitor $C_{DSC}$, thereby multiplying the VGA gain for amplifier 270 by (40+20)/40=3/2, where 40 and 20 refer respectively to the fF size of $C_{DSC}$, $D'_{DSC}$. Similarly, an alternate tuning results using the following transistor gate signals VGA3=1, VGA1=0, VGA2=1, VGA4=0, which result in charge from $C_{DSC}$ (40 fF) being dumped into $C'_{DSC}$ (20 fF). This in turn multiplies the VGA gain of amplifier 270 by (40+20)/20=3.

Thus during readout, the amplifier gain multiplier can be set to 1×, 1.5×, or 3× for the exemplary configuration of FIG. 14. Note that changing the $A_G$ gain setting does not affect the total signal charge in the system, even if the output saturates. Thus even if the system saturates, setting $A_G$ to 3× does not affect the pixel reading if gain $A_G$ is later set to 1×. Note that other gain settings, including additional gain settings choices can be implemented by providing more than two capacitors for the amplifier feedback loop.

According to the present invention, during the readout phase each row of pixels in array 60" is read out sequentially. First the row is copied into row buffer 65, preferably provided at the bottom of array 60". Next, each column of row buffer 65 is sent to an analog-to-digital converter that may be regarded as part of I/O circuitry 120 (see FIG. 17A).

Row buffer 65 preferably is a one dimensional array of row buffer elements, having an element for each row in array 60". To enable a-postiori VGA gain according to this aspect of the present invention, each row buffer element is augmented so as to detect saturation and reject rather than store an incoming pixel value if saturated. First each VGA amplifier 270 in the array row currently being read is set to the highest gain value, 3× in the above-described example. Those row buffer elements that receive a non saturated signal from their corresponding pixels will latch the pixel signal values and record the gain setting for which the value has been latched (3×, in this example). Next the VGA for the same row is set to a reduced gain value of 1.5× (according to the above example). Those row buffer elements that have not already latched a value and that now receive a non-saturated signal from their corresponding pixels will now latch the pixel signal values and record the gain setting at which the value was latched at (2×, in this example). Finally the VGA amplifiers for the same row are set to a gain value of 1× (for the present example). Those row buffer elements that have not already latched a value, latch the pixel signal values and record the gain setting at which the value has been latched (1× in this example).

At the end of this process, each element in the row buffer array has latched a value and has recorded the gain setting at which the value was latched. Also, each element in the row buffer has latched the highest gain setting achievable without saturation (except for those elements saturated at gain 1×). By sending the latched signal value and the gain setting at which the signal value was latched, a correct value of the pixel signal can be determined with high accuracy and low noise.

Alternative embodiments can, of course, increment rather than decrement amplifier gain $A_G$ or even randomly or otherwise scan or vary $A_G$ and cause the row buffer to latch the non-saturated gain value for each amplifier associated with pixels in a row.

The first and second aspects of the present invention preferably are combinable into an overall system. For example, FIG. 17A depicts a time-of-flight system 400 that preferably emits modulated optical energy. Some of this emitted modulated optical energy is reflected by a target object 20' and is detected by differential pixel photodiodes 70' and their associated electronics 80''', in an array 60'', typically fabricated on a CMOS IC 30'. As noted herein, photodiodes 70' may also be sensitive to common mode optical energy, e.g., from ambient light source 310. Among other functions, system 400 can determine range distance z to the target object. System 400 preferably includes the present invention within electronics 80''', and thus exhibits enhanced ability to cope with large magnitudes of differential detection signals, and further exhibits enhanced signal/noise ratios in the pixel detection path.

In the configuration of FIG. 17A, target object 20' is a so-called virtual input device, here the optically projected image of a computer-type keyboard. As a user "types" on the "keys" of the virtual keyboard, system 400 can determine which virtual key was "contacted" and when time of contact occurred. Electronics within system 400 can then output relevant scan code to a companion device 500, perhaps a PDA, a cell telephone, a kiosk, a computer, etc. Advantageously, system 400 can function well, even in the presence of strong ambient light. Further details as to such implementations of TOF systems may be found in U.S. Pat. No. 6,710,770 (2004), U.S. Pat. No. 6,690,354 (2004), and 6,614,422 (2003), assigned to Canesta, Inc. of Sunnyvale, Calif.

Figure 17B:
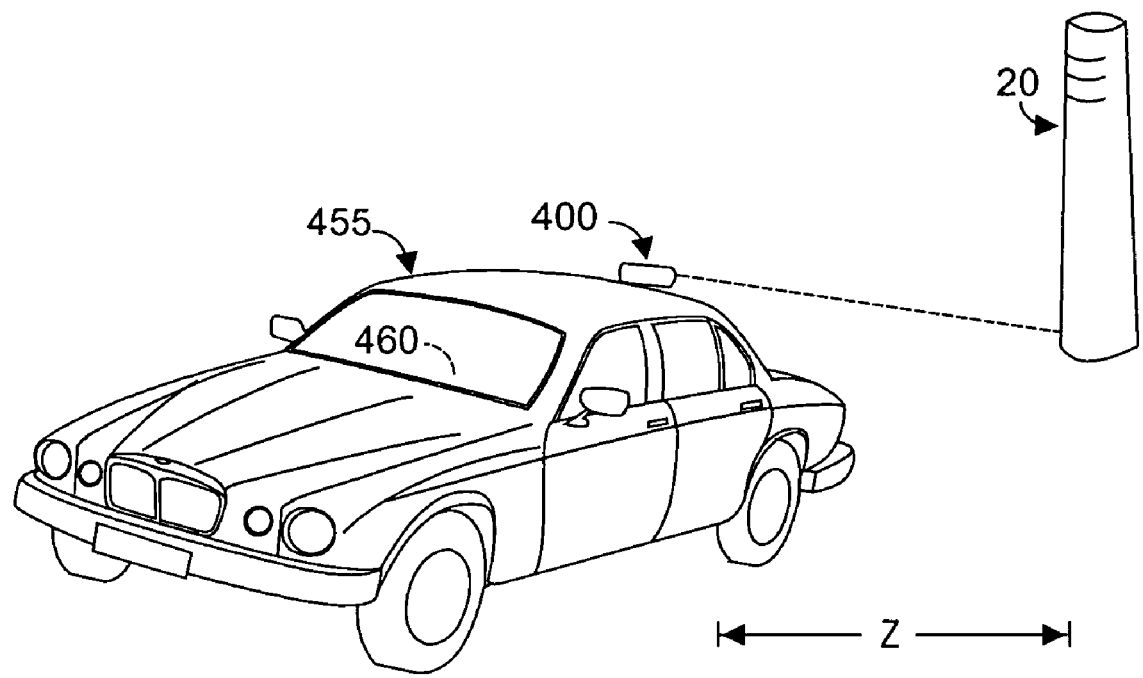
FIG. 17B depicts a TOF system including differential pixels according to the present invention, used to implement security and warning imaging.
Figure 17C:
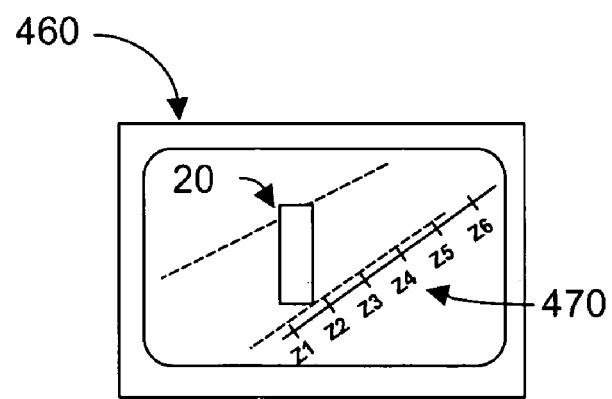

FIGS. 17B and 17C depicts yet another application of system 400, such as shown in FIG. 17A. For ease of illustration, system 400 is shown deployed looking rearward on the rear portion of a motor vehicle 455. System 400 acquires z depth data, among other information, and can display information 470 on a monitor 460 within the vehicle, perhaps a heads-up-display. Output from system 400 can provide the operator of vehicle 455 with visual (and acoustic, if desired) warning as to dangerously close proximity of objects 20 within the vehicle's path. As such, system 400 can augment the vehicle operator's ability to drive safely, despite blind zones. System 400 could instead be deployed within vehicle 455, perhaps aimed towards the front passenger seat. As such system 400 could determine the size and disposition of a target object in the front passenger seat and communicate such information to another system within the vehicle. Such other system might be the control system for deployment of the emergency air bag. Thus if system 400 determines that a child is the front seat passenger, such information might be used to override deployment of the air bag, or perhaps cause deployment as less than full force, so as to reduce air bag injury to the child. Obviously many applications can be found for system 400, especially in environments where the present invention can help detect useful depth data, despite less than ideal environmental conditions.

Various embodiments of the present invention have been described in the context of enhancing performance of differential pixel detectors, commonly used in time-of-flight systems. However it is to be understood that embodiments of the present invention may be used in other applications that may involve differential detection signals that may have high amplitude, and whose signal path may require enhanced signal/noise characteristics. Further, those skilled in the art will appreciate that various described embodiments or portions thereof may be implemented using components other than the specific semiconductor switches, amplifiers, comparators, integrators, counters, etc. described herein.

Modifications and variations may be made to the disclosed embodiments without departing from the subject and spirit of the present invention as defined by the following claims.

What is claimed is:

1. A method to increase effective differential dynamic range of a differential pixel responsive to optical energy, a detection response of said differential pixel having a common mode component and a differential component, the method including:
   (a) adding a fixed magnitude compensating offset selected from $+\Delta V$ and $-\Delta V$ to a differential signal V(t) detected by said differential pixel, to avoid a saturation magnitude differential signal level; and
   (b) counting number N of times said compensating offset has been added to avoid said saturation magnitude;
   wherein effective magnitude of said differential signal V(t) is proportional to V(t)$\pm$N $\Delta V$.

2. The method of claim 1, wherein step (a) injects an offset of charge to produce said compensating offset.

3. The method of claim 1, wherein step (a) is carried out synchronously by examining magnitude of V(t) at time intervals and compensating at that time if V(t) exceeds a threshold voltage.

4. The method of claim 1, wherein step (a) is carried out asynchronously by compensating V(t) whenever magnitude of V(t) exceeds a threshold voltage.

5. The method of claim 1, wherein said differential pixel includes a differential photodetector, and further including resetting common mode of said differential photodetector;
   wherein common mode saturation of said differential photodetector is avoided.

6. The method of claim 5, further including preserving a differential mode component of said differential photodetector in a differential signal capacitor to reduce differential signal loss during common mode resetting of said differential photodetector.

7. The method of claim 6, wherein steps of resetting common mode and preserving a differential mode component are implemented by sharing at least one component selected from a group consisting of a capacitor, an amplifier, and a MOS transistor.

8. The method of claim 1, wherein value of N is processed in a manner selected from a group consisting of (i) N is stored within said differential pixel and is read-out at end of integration, and (ii) N is stored external to said pixel detector and is periodically updated by reading from said pixel detector whether said differential signal capacitor was changed by $+\Delta V$, by $-\Delta V$, or was not changed.

9. For use with a differential pixel responsive to optical energy, a detection response of said differential pixel having a common mode component and a differential component, differential dynamic range enhancing circuitry to enhance effective dynamic range of said differential pixel, said differential dynamic range enhancing circuitry comprising:
   means for adding a fixed magnitude compensating offset selected from $+\Delta V$ and $-\Delta V$ to a differential signal V(t) detected by said differential pixel, to avoid a saturation magnitude differential signal level; and
   means for counting number N of times said compensating offset has been added to avoid said saturation magnitude;

wherein effective magnitude of said differential signal V(t) is proportional to $V(t) + N \Delta V$.

10. The differential dynamic range enhancing circuitry of claim 9, wherein said means for adding injects an offset of charge to produce said compensating offset.

11. The differential dynamic range enhancing circuitry of claim 9, wherein said means for adding functions in a manner selected from a group consisting of (i) synchronously by examining magnitude of V(t) at time intervals and compensating at that time if V(t) exceeds a threshold voltage, and (ii) asynchronously by compensating V(t) whenever magnitude of V(t) exceeds a threshold voltage.

12. The differential dynamic range enhancing circuitry of claim 9, wherein said means for counting operates in a manner selected from a group consisting of counting N within said differential pixel and reading-out N at end of integration, and storing N external to said pixel detector and periodically updating N by reading from said pixel detector whether said differential signal capacitor was changed by $+\Delta V$ or by $-\Delta V$.

13. The differential dynamic range enhancing circuitry of claim 9, wherein said differential pixel includes a differential photodetector, and wherein said circuitry is part of a time-of-flight system that includes at least one of (i) means for resetting common mode of said differential photodetector, and (ii) means for preserving a differential mode component in a differential signal capacitor to reduce differential signal loss, wherein said differential dynamic range enhancing circuitry shares at least one component selected from a group consisting of a capacitor, an amplifier, and a MOS transistor, with at least one of said means for resetting common mode and said means for preserving.

14. A method to reduce effective noise in the pixel signal readout path of an array of differential pixels, the method including:

(a) individually varying signal gain for each pixel to determine a maximum allowable gain;

(b) for each said pixel, recording said pixel's maximum allowable gain determined at step (a) and also recording a signal value for said pixel at said maximum allowable gain; and (c) operating said pixel at said maximum allowable gain;

wherein effect of noise in components downstream of said pixel is reduced and signal/noise ratio is enhanced.

15. The method of claim 14, wherein:

step (a) includes attempting operation at all possible gain values for each said pixel; and within a row of said array, step (b) includes row-wise recording maximum-non saturating gain for each said pixel in said row.

16. For use with a differential pixel responsive to optical energy, said differential pixel having a detection response with a common mode component and a differential component, signal/noise enhancement circuitry to reduce effective noise in the pixel signal readout path of an array of differential pixels, the signal/noise enhancement circuitry including:

means for individually varying signal gain for each pixel to determine a maximum allowable gain;

for each said pixel, means for recording said pixel's maximum allowable gain determined at step (a) and also recording a signal value for said pixel at said maximum allowable gain; and operating said pixel at said maximum allowable gain;

wherein effect of noise in components downstream of said pixel is reduced and signal/noise ratio is enhanced.

17. The signal/noise enhancement circuitry of claim 16, wherein:

said means for individually incrementing attempts operation at all possible gain values for each said pixel; and said means for recording records, within a row of said array, a row-wise record of maximum-non saturating gain for each said pixel in said row.

18. A CMOS-implementable range finding system that emits amplitude modulated optical energy towards a target object and includes an array of differential pixels including pixel photodetectors to differentially detect at least a fraction of said optical energy reflected by said target object even in the presence of ambient optical energy, said differential pixel photodetectors having a detection response with a common mode component, the range finding system including:

means for substantially rejecting said common mode component such that saturation of said differential pixel photodetectors therefrom is reduced;

means for retaining differentially detected reflected said optical energy; and at least one of:

(i) means for increasing effective differential dynamic range of said differential pixels; and (ii) means for enhancing signal/noise through a detection signal path of said system.

19. The range finding system of claim 18, wherein at least one of said means for increasing effective differential dynamic range, and said means for enhancing signal/noise share, on a per differential pixel basis, at least one component with at least one of (i) said means for substantially rejecting, (ii) said means for retaining, and (iii) each other.

20. The range finding system of claim 18, wherein said target object includes at least one of (i) a virtual input device, (ii) an object presenting a potential hazard to a motor vehicle, (iii) an object within a motor vehicle.

* * * * *